United States Patent [19]
Dehnel

[11] Patent Number: 5,382,893
[45] Date of Patent: Jan. 17, 1995

[54] MAXIMUM POWER REGULATED BATTERY CHARGER

[75] Inventor: Kris P. Dehnel, Cypress, Tex.

[73] Assignee: Compaq Computer Corporation, Houston, Tex.

[21] Appl. No.: 701,657

[22] Filed: May 16, 1991

[51] Int. Cl.[6] .............................................. H02J 7/00
[52] U.S. Cl. ....................................... 320/32; 320/35; 307/66
[58] Field of Search ..................... 320/32, 13, 14, 31, 320/35, 39; 363/21, 92; 307/66

[56] References Cited
U.S. PATENT DOCUMENTS

| | | | |
|---|---|---|---|
| 3,599,073 | 8/1971 | Wilson et al. | 320/39 |
| 4,006,397 | 2/1977 | Catotti et al. | 320/31 |
| 4,075,504 | 2/1978 | Gnaedinger | 307/66 |
| 4,276,591 | 6/1981 | Quick | 363/92 |
| 4,433,277 | 2/1984 | Carollo et al. | 320/24 |
| 4,503,378 | 3/1985 | Jones et al. | 320/20 |
| 4,677,363 | 6/1987 | Kopmann | 320/44 |
| 4,933,825 | 6/1990 | Allington et al. | 363/16 |
| 5,021,679 | 6/1991 | Fairbanks et al. | 307/66 |
| 5,055,703 | 10/1991 | Scharnack | 307/64 |
| 5,087,870 | 2/1992 | Salesky et al. | 323/276 |
| 5,136,231 | 8/1992 | Faulk | 320/31 |

OTHER PUBLICATIONS

Middlebrook, "Input Filter Considerations in Design and Application of Switching Regulators," Advances in Switched-Mode Power Conversion, 1976, pp. 91-107.
Compaq Computer Corporation, "SCH. Pwr Sply. Chopper," Released Sep./1988, pp. 1-2.
Compaq Computer Corporation, "SCH. Primary Contr. Chopper," Released Sep./1988, p. 1-2.

Primary Examiner—Steven L. Stephan
Assistant Examiner—Adolf Berhane
Attorney, Agent, or Firm—Pravel, Hewitt, Kimball & Krieger

[57] ABSTRACT

An AC adapter that allows a lower power rating while still providing the necessary power to a load which is substantially constant over a varying voltage range and to charge a discharged Ni-Cad battery in a desired time. The AC adapter regulates its output power to a maximum level just greater than the maximum of the load rather than providing a controlled current until a predetermined fully charged voltage is attained. In this manner, the output voltage and current are allowed to vary inversely with respect to each other in order to maintain the desired power level, allowing the output current level to be reduced as the voltage level increases. A regulated voltage mode is also provided to keep the output voltage from rising above a predetermined maximum level should the Ni-Cad battery be disconnected. One preferred embodiment includes a regulated current mode wherein the current through the Ni-Cad battery is maintained at the desired trickle level once the battery is fully charged.

30 Claims, 6 Drawing Sheets

MAXIMUM POWER REGULATED BATTERY CHARGER

BACKGROUND OF THE INVENTION

1. Field of the Invention

The present invention relates to a circuit and method for providing a regulated power source to provide power to a DC-DC converter and to charge a Ni-Cad battery.

2. Description of the Prior Art

An AC adapter converts AC line voltage to DC voltage to provide regulated power to various electronic devices, including portable computers. If the device includes a Ni-Cad battery, the AC adapter must provide enough power to operate the device and to charge the Ni-Cad battery. A portable computer uses a DC-DC switching converter to convert the single DC voltage provided by the AC adapter into the multiple DC voltages needed by the electrical circuits within the computer. In this configuration, the Ni-Cad battery and the DC converter are, for the most part, electrically in parallel with each other. The AC adapter provides the raw power to charge the Ni-Cad battery and to operate the DC-DC converter, and the DC-DC converter converts the raw power to the necessary power needed by the portable computer. If the AC adapter is removed, the Ni-Cad battery provides the necessary power to operate the DC-DC converter.

It is desirable, especially in portable computers, to keep the size and weight of the AC adapter as small and light-weight as possible. The physical size, weight and power rating of the AC adapter is proportional to the power that is processed by the AC adapter.

The AC adapter must generate enough power for the DC-DC adapter, taking into account its efficiency, to guarantee that the Ni-Cad battery is charging during its entire charging cycle and to guarantee that the Ni-Cad battery is charged in a desired time. A DC-DC converter is essentially a constant power device, assuring a regulated output voltage and a substantially constant output current. The input voltage of the DC-DC converter can vary, within a specified range, as long as the input current varies inversely so that the resulting input power is sufficient to operate the DC-DC converter. Also, the DC-DC converter has a certain efficiency rating such that the power available to the computer from the DC-DC converter is somewhat less than the power applied at the input of the DC-DC converter.

The Ni-Cad battery requires a certain amount of energy at all times while connected to ensure that it is being charged. This is especially important at the beginning of a charge cycle where the Ni-Cad battery voltage is near the minimum required voltage for the DC-DC converter. If the AC adapter does not supply enough power, the Ni-Cad battery might be temporarily discharged, which could pull the voltage down below the voltage needed by the DC-DC converter. Further, the Ni-Cad batteries must be charged at a sufficient rate so that they are fully charged from a discharged state in a desired amount of time.

The AC adapter must be designed to sustain the proper voltage and current requirements to ensure that the Ni-Cad battery, if connected, will be charging at all times and in sufficient time. The voltage of a discharged Ni-Cad battery is low and rises as it is charged until it reaches its maximum voltage level. The voltage supplied by the AC adapter must always be at least as large as the Ni-Cad battery voltage so that the battery is always being charged. Likewise, the AC adapter must be able to provide more current than the DC-DC converter needs at any given voltage level within the specified voltage range. Once the Ni-Cad battery is fully charged, a trickle current must be maintained through the battery to keep it charged.

The conventional AC adapter was designed to provide output voltage regulation with a maximum current limit. This conventional design required that the regulated output voltage of the AC adapter had to be at least as great as the maximum Ni-Cad battery voltage when fully charged to prevent discharging of the battery. Furthermore, the conventional AC adapter had to be able to provide at least the maximum current drawn by the DC-DC converter when a discharged Ni-Cad battery was inserted into the system, plus enough extra current to guarantee that the battery began charging. The voltage of the Ni-Cad battery controls the input voltage to the DC-DC converter, such that the DC-DC converter draws more current in order to meet its input power requirements when a discharged Ni-Cad battery is installed. Therefore, the lowest value for the maximum current limit was approximately equal to the maximum current required by the DC-DC converter (at the minimum voltage level) plus enough extra current to guarantee some battery charge current. The conventional AC adapter thus had to have a minimum power rating of the regulated output voltage multiplied by the maximum current limit.

Even if the low voltage battery charge current was set at minimal levels, the minimum power rating, as derived from the conventional method of designing the AC adapter, however, is significantly larger than the theoretical power needed by the DC-DC converter and the Ni-Cad battery, both at a worst case instant and cumulatively over the desired charge time period, to meet the continuous charging and charge time period requirements. Consequently, the physical size and weight of the conventional AC adapter was significantly larger than theoretically necessary since its size and weight was proportional to its power rating.

Consider, for example, a DC-DC converter which requires an input power of twenty watts. Also, assume that the Ni-Cad battery needs an average of ten watts of power to fully charge it within the desired amount of time. Theoretically, then, an AC adapter need only provide approximately thirty watts of power to operate the DC-DC converter and to charge the Ni-Cad battery at the minimum desired rate. Assume that the Ni-Cad batteries in the example range from 10 volts when discharged to 18 volts when fully charged. Since a discharged Ni-Cad battery would pull the voltage down to ten volts at the beginning of the charge cycle, the DC-DC converter needs about two amperes of current in order to meet its input power requirement of twenty watts. The conventional AC adapter would provide a small additional amount of current above the two amperes in order to guarantee that the battery starts to charge in order to avoid discharging. Therefore the current limit is set at just over 2 amperes. Eventually, the Ni-Cad battery voltage reaches eighteen volts so that the conventional AC adapter had to regulate its output voltage to at least eighteen volts. The conventional AC adapter, therefore, had to have a power rating of at least eighteen volts times two amperes, which equals thirty six watts. Recall that theoretically, only thirty watts was necessary to achieve this task. The power rating of the conventional AC adapter was, therefore, at least twenty percent greater than necessary, which made it approximately twenty percent larger than necessary, all other things being equal.

SUMMARY OF THE INVENTION

The AC adapter of the present invention provides a method and circuit that allows a lower power rating for the AC adapter while still providing the necessary power to operate the computer and to charge the Ni-Cad battery within a certain period of time. The AC adapter includes a regulated power mode wherein it regulates its output power at a maximum power level until the desired voltage regulation level is attained, rather than regulating its output current at a maximum current limit until the desired voltage regulation level is matched. This maximum output power is sufficient to operate the DC-DC converter and to charge the Ni-Cad battery such that whatever power is not consumed by the DC-DC converter is available to charge the Ni-Cad battery. The regulated maximum output power characteristic of the AC adapter of the present invention allows its output current to decrease as its output voltage increases to maintain the desired power level.

The AC adapter with the maximum power regulated characteristic comprises a constant frequency flyback DC-DC converter with, preferably, a discontinuous inductor current such that the peak inductor current is limited to a maximum value. The AC line voltage is converted to an unregulated DC voltage. A transistor switch is turned on which connects the unregulated DC voltage across the primary inductance of a transformer. This voltage induces a current to flow through the primary until it reaches a certain maximum level, at which time the transistor switch is turned off. The energy stored in the primary inductance of the transformer is then transferred to the output circuit of the AC adapter. This process is continually repeated at a predetermined constant frequency. Using this configuration, most of the energy stored in the primary inductance of the transformer during each cycle is transferred to the output before the next cycle begins. The energy stored during each cycle is $\frac{1}{2} Li^2$, where L is constant and represents the primary inductance of the transformer, and i is the peak current in the primary inductance. The power transferred to the output is $\frac{1}{2} Li^2 f$, where f is the switching frequency of the AC adapter. If the peak current in the primary inductance is limited to a predetermined maximum value and the switching frequency is kept constant, and, if all the stored energy is transferred to the output during each cycle, the output power of the AC adapter will also be maintained at a predetermined maximum level even if the load at the output requests more power. The values of f, i and L are chosen to provide the necessary power as described above. In the preferred embodiment, a commercial pulse width modulation (PWM) controller integrated circuit (IC) provides the capability to control both the peak current and the frequency.

The AC adapter of the present invention includes power limit circuitry so that it can lower the output power when the Ni-Cad battery is not connected. If the Ni-Cad battery was removed without this power limiting capability, the AC adapter would provide more power than the DC-DC converter could consume. Therefore, a regulated voltage mode is provided where the output power is limited below the maximum power level to regulate the output voltage at a predetermined maximum voltage level. In the two preferred embodiments disclosed herein, for example, the output voltages are limited to maximum levels of 18.05 volts and 30 volts.

One preferred embodiment of the AC adapter of the present invention includes circuitry to monitor the temperature and charge current of the Ni-Cad battery. This first embodiment determines that the Ni-Cad battery is fully charged when the battery's temperature reaches a predetermined maximum level, and then controls the output power to maintain a trickle current through the Ni-Cad battery in order to keep it charged. The current through the fully charged Ni-Cad battery should not be allowed to rise above this trickle rate since it could damage the battery. Therefore, a regulated current mode is provided where the current through the Ni-Cad battery is regulated at the trickle rate.

The second preferred embodiment of the AC adapter relies on a separate charge rate controller circuit to monitor the temperature and charge current of the Ni-Cad battery. The charge rate controller circuit performs similar functions as the monitoring circuitry of the first embodiment of the AC adapter. The second embodiment is similar to the first embodiment in that it operates in regulated power and voltage modes but does not, however, operate in a regulated current mode since this function is performed by the charge rate controller.

BRIEF DESCRIPTION OF THE DRAWINGS

A better understanding of the present invention can be obtained when the following detailed description of the preferred embodiments is considered in conjunction with the following drawings, in which.

DETAILED DESCRIPTION OF THE PREFERRED EMBODIMENTS

Figure 1:
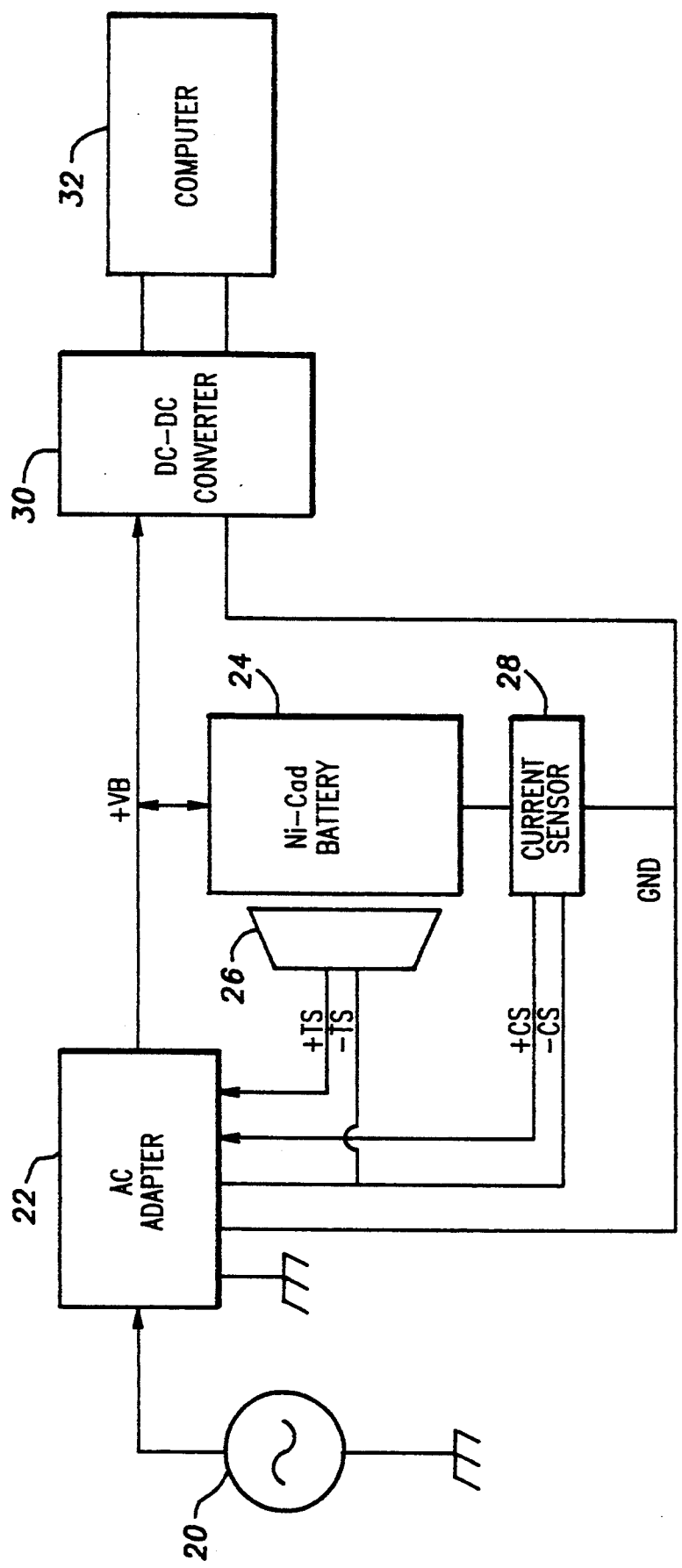
FIG. 1 is a block diagram of a computer system using a Ni-Cad battery and one embodiment of the AC adapter of the present invention.

Referring now to FIG. 1, an AC source 20 is shown connected to one embodiment of an AC adapter 22 according to the present invention. The AC adapter 22 converts the AC voltage from the AC source 20 to a DC voltage between a +VB signal and ground to provide power to a DC-DC converter 30 and to charge a Ni-Cad battery 24. The DC-DC converter 30 is connected between the +VB signal and ground and provides the necessary power to operate a computer 32. The computer 32 is connected to the output of the DC-DC converter 30. The positive terminal of the Ni-Cad battery 24 is connected to the +VB signal. A temperature sensor 26 is preferably in good thermal contact with the Ni-Cad battery 24 to allow the temperature sensor 26 to accurately determine the temperature of the Ni-Cad battery 24. The temperature sensor 26 converts the battery temperature into a proportional voltage between a +TS signal and a −TS signal, which are both connected to and used by the AC adapter 22. A current sensor 28 is preferably coupled in series between the negative terminal of the Ni-Cad battery 24 and ground so that the current sensor 28 can determine the level of current through the Ni-Cad battery 24. The current sensor 28 outputs a voltage between a +CS signal and a −CS signal which is proportional to the current through the Ni-Cad battery 24. The AC adapter 22 is connected to the +CS and −CS signals. In this preferred embodiment, the AC adapter 22 monitors the battery temperature through the voltage between the +TS and −TS signals and the battery current through the voltage between the +CS and −CS signals, where the −TS and −CS signals are connected together.

Figure 2:
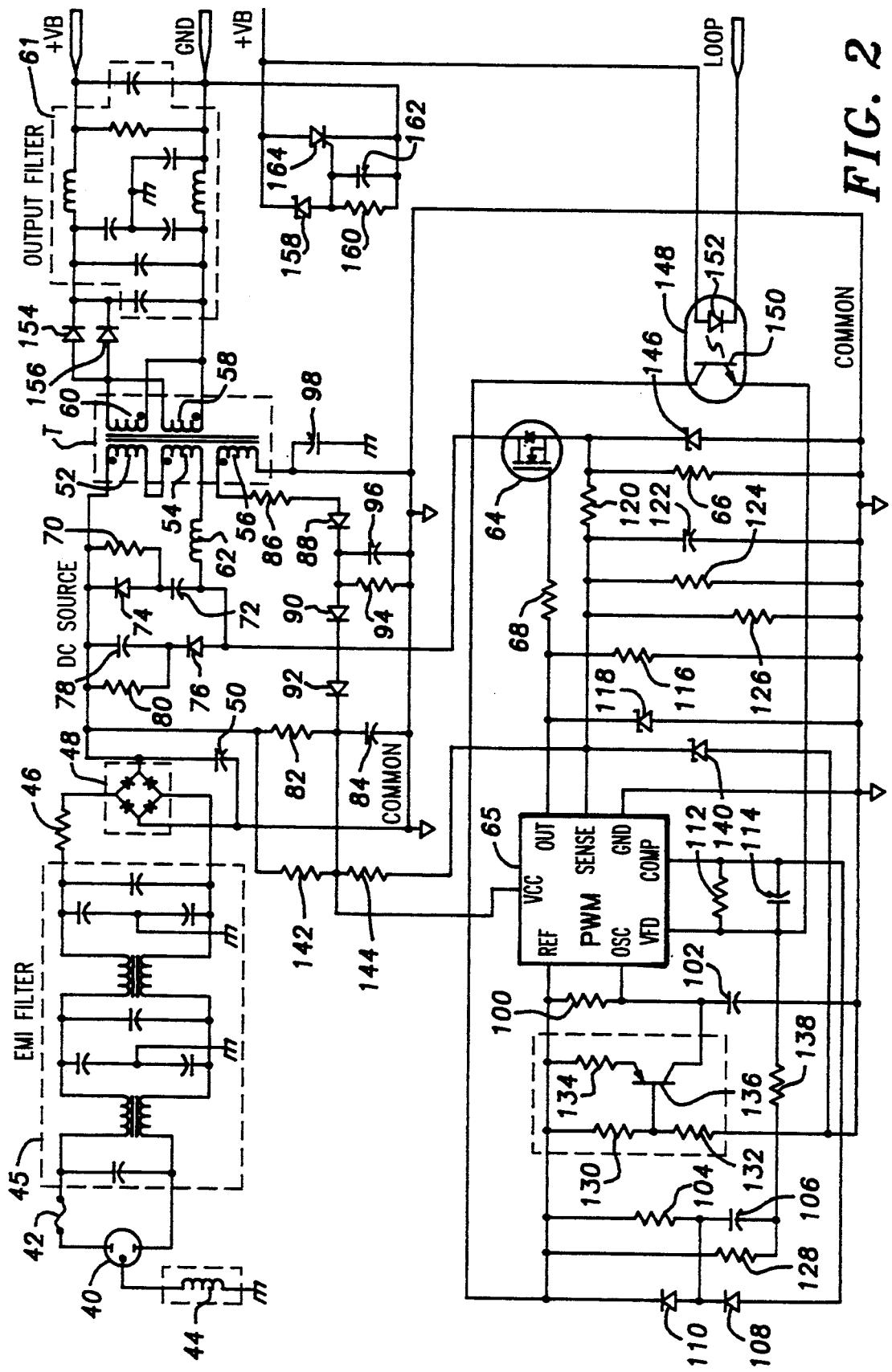
FIG. 2 is an electrical schematic diagram of portions of the AC adapter of FIG. 1 illustrating the maximum power regulation technique.

In the preferred embodiment of the AC adapter 22, two circuit boards are utilized, a primary board generally having the energy path related components and a secondary board generally having control components. FIG. 2 is a more detailed electrical schematic diagram of the primary board of the first preferred embodiment of the AC adapter 22 illustrating the maximum power regulated method. The AC source 20 is connected to an AC receptacle 40 in the normal way as known to those skilled in the art. The line terminal of the AC receptacle 40 is connected to one side of a fuse 42 and the other side of the fuse 42 is connected to the line input terminal of an electromagnetic interference (EMI) filter 45. The common terminal of the AC receptacle 40 is connected to the common input terminal of the EMI filter 45 and the ground terminal of the AC receptacle 40 is connected to one side of a filter inductor 44. The other side of the filter inductor 44 is connected to the chassis ground. The EMI filter 45 protects the AC adapter 22 from outside conducted noise and keeps noise generated within the AC adapter 22 from being conducted to the AC source 20.

The line output terminal of the EMI filter 45 is connected to one end of a thermistor 46, which is used to limit input surge current. The other end of the thermistor 46 is connected to the positive AC terminal of a full-wave bridge rectifier 48 which converts AC voltage to pulsating DC voltage. The common output terminal of the EMI filter 45 is connected to the negative AC terminal of the full-wave bridge rectifier 48. The negative output signal of the rectifier 48 is referred to as COMMON and the positive output signal of the rectifier 48 is referred to as DC SOURCE. In the preferred embodiment, the rectifier 48 is specified for operation to 1000 volts peak, thus allowing for a wide range of input AC voltages (120–240 volts) and eliminating the need for an automatic line switching (ALS) circuit. A filter capacitor 50 is connected between the DC SOURCE signal and COMMON and converts the pulsating DC voltage into an unregulated DC voltage.

A power transformer, generally referred to by the letter T, serves to isolate the output circuitry from the input circuitry. The transformer T also serves to transfer power from the unregulated DC SOURCE signal to the output of the AC adapter 22 and preferably operates at a high frequency to reduce the bulk associated with low frequency transformers. The transformer T in the current preferred embodiment has five windings: two primary windings 52 and 54 for input power, a primary winding 56 for a bootstrap circuit described below, and two secondary windings 58 and 60 for output power.

The dotted terminal of the primary winding 52 is connected to the DC SOURCE signal and the undotted terminal of the primary winding 52 is connected to the dotted terminal of the primary winding 54. The undotted terminal of the primary winding 54 is connected to one side of a saturable inductor 62 and the other side of the inductor 62 is connected to the input terminal of a power switching transistor 64. The power switching transistor 64 is preferably an n-channel enhancement metal-oxide-semiconductor field effect transistor (MOSFET) where the drain is the input terminal, the source is the output terminal, and the gate is the control terminal. The output terminal of the switching transistor 64 is connected to one side of a current sense resistor 66, and the other side of the resistor 66 is connected to COMMON. The control terminal of the switching transistor 64 is connected to one side of a current limit resistor 68 and the other side of the resistor 68 is connected to the output terminal of a pulse-width modulated (PWM) controller integrated circuit 65. In this preferred embodiment, the PWM circuit 65 can be implemented by a current mode PWM controller, such as the UC3844AN, manufactured by Unitrode Integrated Circuits of New Hampshire.

As described above, the primary windings 52 and 54 of the transformer T are coupled in series with the inductor 62, the input and output of the switching transistor 64 and the primary current sense resistor 66, between the DC SOURCE signal and COMMON. In general, the PWM circuit 65 toggles its output voltage to toggle the control terminal of the switching transistor 64 to turn it on and off at a specified frequency. When turned on, the switching transistor 64 allows current to flow from the DC SOURCE signal, through the primary windings 52 and 54, through the inductor 62 and through the primary current sense resistor 66 to COMMON. Most of the energy from this current flow is stored in the primary windings 52 and 54 of the transformer T. When the PWM circuit 65 output turns the switching transistor 64 off, most of this stored energy is transferred to the output of the AC adapter 22. A small portion of the stored energy is lost due to leakage inductance. This describes the basic flyback mode of operation wherein the energy is stored while current is flowing in the primary windings 52 and 54, and the energy is transferred to the output of the AC adapter 22 when the current through the primary windings 52 and 54 is cut off by the switching transistor 64.

The maximum power regulation characteristic of the present invention is implemented by a maximum peak limited, discontinuous current and constant frequency flyback converter. When the switching transistor 64 turns off, almost all of the energy stored in the primary windings 52 and 54 of the transformer T during each cycle is transferred to the output The energy stored is $\frac{1}{2} Li^2$, where L is the sum of the values of the primary inductances of the primary windings 52 and 54, and i is the peak current in the primary windings 52 and 54. The power transferred to the output is $\frac{1}{2} Li^2 f$, where f is the switching frequency. The switching frequency f is preferably a high frequency in the range of 60 kHz to keep the transformer T small. If the peak current i is limited to a maximum level, and the frequency f is kept constant, the output power of the AC adapter 22 will be regulated at a maximum level. This maximum power level can be set to a value just sufficient to provide the maximum input to the DC-DC converter 30 plus the minimum power necessary to charge the Ni-Cad battery 24 within a desired amount of time.

The advantage of using the maximum power regulated method described above is that it allows a smaller power rating than AC adapters of prior art. AC adapters of prior art regulate the output voltage and limit the output current to a certain maximum level. The regulated voltage level for an AC adapter of prior art must be at least as high as the maximum voltage of a fully charged Ni-Cad battery 24. The maximum current limit must be at least as high as the maximum current drawn by the DC-DC converter 30 when a discharged Ni-Cad battery 24 is installed, plus enough extra current to guarantee that the Ni-Cad battery will begin charging. The power rating of the AC adapter of prior art, therefore, must be at least the regulated voltage level multiplied by the maximum current limit, and this power rating is significantly higher than necessary to charge the Ni-Cad battery 24 and to operate the DC-DC converter 30.

In general, the AC adapter 22 of the present invention regulates the output power during a regulated power mode and does not regulate the output current at a maximum current limit. In this manner, if the output voltage is pulled to a low level, the output current will increase as necessary to maintain the desired power level. The Ni-Cad battery 24 absorbs whatever power is not used by the DC-DC converter 30. During regulated power mode the output voltage is effectively controlled by the Ni-Cad battery 24 voltage, with the current being provided based on this voltage and the power limit. As the Ni-Cad battery 24 voltage increases, as would occur when the Ni-Cad battery 24 is being charged because the DC-DC convertor 30 draws less than the maximum regulated power, the voltage gradually increases. This results in the current slowly decreasing, because of the power regulation. The load provided by the DC-DC converter 30 stays relatively constant, the DC-DC converter 30 providing a regulated output voltage and the computer 32 drawing an essentially constant power, so the power being provided to the Ni-Cad battery 24 remains substantially constant. This constant power to the Ni-Cad battery 24 allows simple calculation to determine the charge time, thus allowing the designer ease in determining the maximum power limit at which to regulate. The power rating of the AC adapter 22 of the present invention is lower than AC adapters of prior art since it allows the current to decrease as the voltage increases, the conditions which cause prior art adapters to have high minimum power constraints.

The switching transistor 64 forces abrupt changes in current through the transformer T, and leakage inductances within the transformer T resist these abrupt changes in current causing stress upon the switching transistor 64. A snubber circuit, composed primarily of three sub-circuits described below, limits this stress to allowable levels and also performs other necessary functions. A slew rate limiter circuit comprised of a resistor 70, a capacitor 72 and a diode 74, slows the rise of the voltage potential appearing at the input terminal of the switching transistor 64, which reduces stress in the switching transistor 64 when it is turning off. This slew rate limiter circuit also decreases conducted emissions that occur while the switching transistor 64 is turning off. The capacitor 72 is connected between the input terminal of the switching transistor 64 and the anode of the diode 74. One side of the resistor 70 is connected to the anode of the diode 74, and the other side of the resistor 70 and the cathode of the diode 74 are connected to the DC SOURCE signal.

A peak clipper circuit is comprised of a diode 76, a capacitor 78 and a resistor 80. The anode of the diode 76 is connected to the input terminal of the switching transistor 64, and the cathode of the diode 76 is connected to one side of the resistor 80 and to one side of the capacitor 78. The other side of the resistor 80 and the other side of the capacitor 78 are connected to the DC SOURCE signal. The peak clipper circuit eliminates voltage spikes created as a result of the inductive kick generated by the leakage inductance of the transformer T while the switching transistor 64 is turning off. The voltage spike forward biases the diode 76 and the energy is stored in the capacitor 78. When the switching transistor 64 is turned on again, the diode 76 is turned off and the energy stored in the capacitor 78 is dissipated as heat in the resistor 80.

The saturable inductor 62 provides a large impedance when the switching transistor 64 is turned on to reduce conducted emissions. The inductor 62 also dampens the ringing that occurs when the switching transistor 64 is turning off.

A dropping resistor 82 is connected between the DC SOURCE signal and the VCC terminal of the PWM circuit 65, and a reservoir capacitor 84 is connected between the VCC terminal of the PWM circuit 65 and COMMON. The GND terminal of the PWM circuit 65 is also connected to COMMON. The resistor 82 and the capacitor 84 provide the initial surge of energy from the DC SOURCE signal to start-up the PWM circuit 65. After the AC adapter 22 starts operating, the bootstrap circuit formed by the primary winding 56, resistors 86 and 94, a capacitor 96 and diodes 88, 90 and 92, take over and provide the power to operate the PWM circuit 65. A filter capacitor 98 is connected between COMMON and chassis ground. The voltage across the primary winding 56, which is coupled out of phase with the primary windings 52 and 54 of the transformer T, supplies the operating current for the PWM circuit 65. The dotted terminal of the primary winding 56 is connected to COMMON. The undotted terminal of the primary winding 56 is connected to one side of the current limit resistor 86. The other side of the resistor 86 is connected to the anode of the diode 88, and the cathode of the diode 88 is connected to the anode of the diode 90. The cathode of the diode 90 is connected to the anode of the diode 92, and the cathode of the diode 92 is connected to the VCC terminal of the PWM circuit 65. The resistor 94 and the capacitor 96 are electrically connected in parallel between the cathode of the diode 88 and COMMON.

The diodes 88, 90 and 92 determine the proper voltage at the VCC terminal of the PWM circuit 65 and the resistor 86 limits the current through the primary winding 56 and the capacitors 84 and 96 provide storage and filtering functions for the bootstrap circuit. The specific operation of the bootstrap circuit is well known to those skilled in the art an will not be described in detail.

The PWM circuit 65 circuit contains most of the components needed to control the AC adapter 22. The PWM circuit 65 has a built-in oscillator, the frequency of which is determined by an external R-C network. A resistor 100 connected between the VREF terminal and the OSC terminal of the PWM circuit 65, and a capacitor 102 connected between the OSC terminal of the PWM circuit 65 and COMMON, determine the frequency, which is preferably 128 kHz in the first embodiment. The PWM circuit 65 of this embodiment divides this frequency by two such that the frequency at the PWM circuit 65 output is 64 kHz. The PWM IC used in this first preferred embodiment does not control this frequency very tightly such that the frequency may actually vary significantly but the accuracy is sufficient so that the output power varies by a significantly smaller amount sufficient to be considered effectively constant.

A resistor 104 is connected between the VREF terminal of the PWM circuit 65 and to one end of a capacitor 106. The other end of the capacitor 106 is connected to COMMON. The resistor 104 and the capacitor 106 are used as a soft-start timer for the PWM circuit 65. A diode 108 has its anode connected to the COMP terminal of the PWM circuit 65 and its cathode connected to the anode of the diode 110. The diode 108 also provides a soft-start function for the PWM circuit 65. A diode 110 has its anode connected at the junction of the resistor 104 and the capacitor 106, and has its cathode connected to the VREF terminal of the PWM circuit 65. If the output of the AC adapter 22 is shorted or if the PWM circuit 65 cannot successfully bootstrap, the diode 110 is used to discharge the capacitor 106.

A resistor 128 is connected between the VREF terminal of the PWM circuit 65 and COMMON. The resistor 128 functions as a bleed resistor for the PWM circuit 65 and its value is chosen to determine when autocycling of the AC adapter 22 occurs. Autocycling is a fault condition whereby the output voltage between the +VB signal and ground of the AC adapter 22 is decreased below the minimum operating voltage of the DC-DC converter 30. The DC-DC converter 30 will shut-down so that the computer 32 cannot be operated. The AC adapter 22 will, however, still provide a certain amount of power to charge the Ni-Cad battery 24. If a deeply discharged Ni-Cad battery 24 (such that its voltage is near zero volts) is connected to the AC adapter 22, therefore, the AC adapter 22 will begin to autocycle and slowly charge the Ni-Cad battery 24 until the Ni-Cad battery 24 contains enough charge and reaches a high enough voltage to allow the AC adapter 22 to operate the DC-DC converter 30.

A resistor 112 and a capacitor 114 are electrically connected in parallel between the VFB or feedback and the COMP terminals of the PWM circuit 65. The resistor 112 and the capacitor 114 are used for roll-off for loop compensation of an operational amplifier internal to the PWM circuit 65. The output of the PWM circuit 65 drives the control terminal of the switching transistor 64 through the current limit resistor 68 as described previously. A resistor 116 is connected between the PWM circuit 65 output terminal and COMMON and is used as a bleed resistor for the switching transistor 64. A Zener diode 118 has its anode connected to COMMON and its cathode connected to the PWM circuit 65 output terminal and is a reverse and overvoltage protection diode.

The sense resistor 66 is used to determine the level of the current through the primary windings 52 and 54 and the switching transistor 64. A resistor 120 is connected between the SENSE terminal of the PWM circuit 65 and the output terminal of the switching transistor 64. A capacitor 122 is connected between the SENSE terminal of the PWM circuit 65 and COMMON. The resistor 120 and the capacitor 122 form a low-pass filter to remove voltage noise spikes from the voltage developed across the resistor 66. A resistor 124 is electrically connected in parallel with another resistor 126 between the SENSE terminal of the PWM circuit 65 and COMMON. The resistor 120 and the resistors 124 and 126 form a voltage divider that divides the voltage across the resistor 66. When the AC adapter 22 is operating at its maximum output power level, the voltage that develops across the resistor 66 rises until the PWM circuit 65 senses a prespecified maximum voltage level at its SENSE terminal. The PWM circuit 65 will then terminate the current through the transformer T by shutting off the switching transistor 64. The PWM circuit 65 will, however, continue again in the next cycle and re-evaluate the condition at its SENSE terminal. In this manner the primary current is limited to a maximum amount.

A resistor 142 is connected between the DC SOURCE signal and to one side of a resistor 144. The other side of the resistor 144 is connected to the SENSE terminal of the PWM circuit 65. The resistors 142 and 144 are feed forward resistors to the SENSE terminal of the PWM circuit 65, and act to compensate for the delay between sensing maximum voltage at the SENSE terminal of the PWM circuit 65 and terminating the current flow through the transistor 64 and the primary windings 52 and 54. A Zener diode 146 has its anode connected to COMMON and its cathode connected to the output terminal of the switching transistor 64. The Zener diode 146 protects against shorting of the switching transistor 64, or other internal shorts which could cause violent destruction of the PWM circuit 65 or the resistor 66.

A feedback signal is sensed by an error amplifier 216 and returned by an opto-coupler 148 to the PWM circuit 65 to implement an output power control loop. The opto-coupler 148 forms the additional function of isolating the output circuit from the input circuit. The opto-coupler 148 has an internal transistor 150 whose collector terminal is connected to the VREF terminal of the PWM circuit 65. The emitter of the transistor 150 is connected to the VFB terminal of the PWM circuit 65. A resistor 138 is connected between the VFB terminal of the PWM circuit 65 and COMMON. The opto-coupler 148 also contains an internal light emitting diode (LED) 152 whose anode is connected to the +VB signal. The cathode of the LED 152 is connected to a signal referred to as LOOP. The LOOP signal is connected to the output control circuitry located on the secondary board. The voltage between the +VB signal and the LOOP signal causes a current to flow through the LED 152 which causes a proportional current to flow through the transistor 150. The proportional current flows from the VREF terminal of the PWM circuit 65 through the transistor 150 and through the resistor 138. The voltage developed across the resistor 138 is sensed by the PWM circuit 65 at its VFB terminal.

The PWM circuit 65 contains an internal error amplifier which amplifies the difference between the voltage sensed at the VFB terminal and an internal reference voltage. Since the VFB terminal is connected to the inverting input of the internal error amplifier, the feedback is negative such that a higher voltage at VGB will give a lower voltage at the output of the error amplifier. The output of this internal error amplifier has a voltage level which represents the level of error in the output voltage or charge current through the Ni-Cad battery 24, as determined by the output control circuitry. This error voltage is compared to the voltage at the SENSE terminal of the PWM circuit 65 which is also internal to the PWM circuit 65. The internal comparator operates to keep the output of the PWM circuit 65 high until the voltage at the SENSE terminal becomes equal to the error voltage, at which time the internal comparator pulls the PWM circuit 65 output low. When the PWM circuit 65 output is high, the switching transistor 64 is turned on allowing current to flow through the primary windings 52 and 54 and the resistor 66, and this current is sensed as a voltage at the SENSE terminal of the PWM circuit 65. When the PWM circuit 65 output is then pulled low, the switching transistor 64 is turned off which terminates the current flow through the primary windings 52 and 54. Since the peak value of the current through the primary windings 52 and 54 defines the output power of the AC adapter 22 as described previously, the level of the error voltage directly affects the output power of the PWM circuit 65.

The error voltage is, however, internally limited to a maximum voltage level of preferably 1 volt. This 1 volt level corresponds to the maximum output power of the AC adapter 22, wherein the maximum output power of the first embodiment is preferably set at 27 watts. In this manner, the output control circuit can control the output power of the AC adapter 22 to a level up to the maximum output power level. If the output control circuit requests more power through the feedback signal than the maximum output power level, the internal error amplifier is said to be saturated such that the PWM circuit 65 limits the output power to the maximum output power level.

The dotted terminals of the secondary windings 58 and 60 are connected together and these terminals are also connected to the return input terminal of an OUTPUT filter 61. The undotted terminals of the secondary windings 58 and 60 are connected together and also connected to the anode of a diode 154. The anode of a diode 156 is connected to the anode of the diode 154. The cathodes of the diodes 154 and 156 are connected together and also connected to the input terminal of the OUTPUT filter 61. The two diodes 154 and 156 are preferably used to handle the output current capacity. In this manner, when the switching transistor 64 is turned on and current flows through the primary windings 52 and 54, a voltage appears across the secondary windings 58 and 60 such that the diodes 154 and 156 are reversed biased and will conduct very little current. Since the diodes 154 and 156 are essentially turned off, little current flows through the secondary windings 58 and 60 while the transistor 64 is turned on, and the energy is stored in the primary windings 52 and 54 of the transformer T. When the switching transistor 64 is turned off, the voltage across the secondary windings 58 and 60 reverses, turning on the diodes 154 and 156 allowing current to flow into the OUTPUT filter 61. The OUTPUT filter 61 contains the necessary capacitors and other components to provide a low-ripple output voltage.

The AC adapter 22 contains an over-voltage protection circuit which shuts down the AC adapter 22 in the event that the output voltage climbs too high. In the first embodiment of the invention, this over-voltage level is preferably set at 19 volts. The +VB signal is connected to the cathode of a Zener diode 158 and the anode of the Zener diode 158 is connected to one side of a resistor 160. The other side of the resistor 160 is connected to ground. A capacitor 162 is electrically connected in parallel with the resistor 160. A silicon controlled rectifier (SCR) 164 has its anode connected to the +VB signal, its cathode connected to ground and its gate connected to the anode of the Zener diode 158. When the output voltage between the +VB signal and ground gets above the breakdown voltage of the Zener diode 158, the Zener diode 158 breaks down and triggers the SCR 164 by causing a potential to develop at the gate across the resistor 160. The SCR 164 subsequently turns on and diverts all output current through it. Since the AC adapter 22 is also current limited, the PWM circuit 65 begins to autocycle, which resets the SCR 164. The capacitor 162 filters noise away from the SCR 164 gate to reduce any chance of false triggering.

Figure 3:
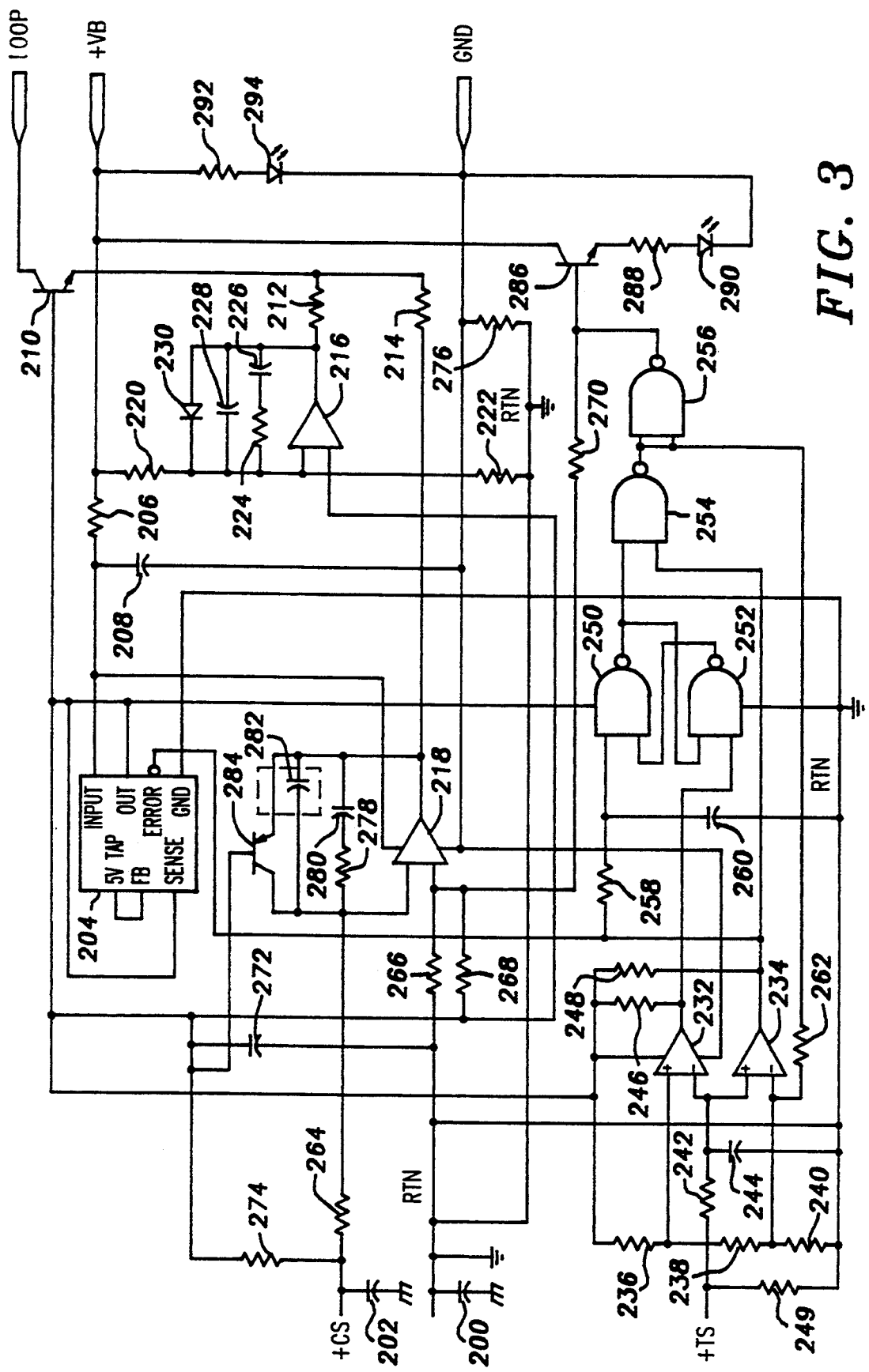
FIG. 3 is an electrical schematic diagram of further portions of the AC adapter of FIG. 1 illustrating the power limit control circuitry.

FIG. 3 is a more detailed schematic of the secondary board of the first embodiment of the AC adapter 22. The secondary board contains the circuitry to control the output power of the AC adapter 22 by controlling the feedback signal through the LED 152 in the optocoupler 148. The temperature of the Ni-Cad battery 24 is monitored through the voltage between the +TS and −TS signals, and the charge current through the Ni-Cad battery 24 is monitored through the voltage between the +CS and −CS signals. The −TS and −CS signals are connected external to the AC adapter 22 and this combined signal is referred to as the RTN signal. A filter capacitor 200 is connected between the RTN signal and the chassis ground. Another filter capacitor 202 is connected between the +CS signal and the chassis ground. The capacitors 202 and 200 act to shunt common mode noise appearing between the +CS signal and the RTN signals to the chassis ground.

The output of the AC adapter 22 is isolated from the input by the power transformer T and the opto-coupler 148. The secondary board must, therefore, derive its power from the output voltage between the +VB signal and ground. A precision voltage regulator 204, such as an LP2951 manufactured by National Semiconductor, is used for this purpose. The +VB signal is connected to one side of a resistor 206, and the other side of the resistor 206 is connected to the input terminal of the voltage regulator 204. A capacitor 208 is connected between the input terminal of the voltage regulator 204 and ground. The resistor 206 and the capacitor 208 serve as additional filtering of the output voltage, which is used to provide the input power to the voltage regulator 204. The FB terminal of the voltage regulator 204 is connected to the 5VTAP terminal of the voltage regulator 204. The output terminal is connected to the SENSE terminal of the voltage regulator 204, and the GND terminal of the voltage regulator 204 is connected to the RTN signal. In this manner, the voltage regulator 204 maintains 5 volts at its output to be used as power and as a reference voltage for other components on the secondary board.

The first preferred embodiment of the AC adapter 22 operates in three separate modes to provide the operating power to the computer 32 through the DC-DC converter 30, and to provide the desired charge current to the Ni-Cad battery 24. The secondary board uses the current sense voltage between the +CS and RTN signals, and the temperature sense voltage between the +TS and RTN signals to determine the mode of operation of the AC adapter 22. As described previously, the cathode of the LED 152 is connected to the LOOP signal. An NPN transistor 210 on the secondary board has its collector connected to the LOOP signal and its base connected to the 5 volt output of the voltage regulator 204. The emitter of the transistor 210 is connected to one side of a resistor 212 and also to one side of another resistor 214. The other side of the resistor 212 is connected to the output of a precision error amplifier 216, such as one of the two operational amplifiers of the LT1013DS, a dual precision operational amplifier integrated circuit manufactured by Linear Technology. The other side of the resistor 214 is tied to the output of another precision error amplifier 218 which is, preferably, of the same type as the error amplifier 216.

Recall that the current through the LED 152 determines the current through the transistor 150 which controls the feedback voltage at the VFB terminal of the PWM circuit 65. The transistor 210 is configured as a voltage follower such that its emitter stays at 4.3 volts. In this manner, the output power of the AC adapter 22 can be controlled by the two error amplifiers 216 and 218 whose outputs are electrically "OR'ed" together to provide an error feedback signal to the PWM circuit 65. The mode of operation of the AC adapter 22 determines which, if either, of the two error amplifiers 216 and 218 is in control. In the regulated power mode wherein the output power of the AC adapter 22 is regulated to its maximum level as will be described below, both the error amplifiers 216 and 218 are saturated such that neither is in control of the output power.

The first mode of operation is referred to as the regulated voltage mode (RVM). The AC adapter 22 will operate in the RVM mode if the Ni-Cad battery 24 is not installed or if the conditions exist that allow the Ni-Cad battery 24 voltage to equal the upper voltage limit. The error amplifier 216, which is part of a voltage sense control loop, is in control of the output voltage when in the RVM mode of operation. The 5 volt output of the voltage regulator 204 is connected to the non-inverting input of the error amplifier 216 and serves as a reference voltage. A resistor 220 is connected between the +VB signal and the inverting input of the error amplifier 216, and another resistor 222 is connected between the inverting input of the error amplifier 216 and the RTN signal. The resistors 220 and 222 form a voltage divider to divide the voltage between the +VB and RTN signals. The resistors 220 and 222 are preferably chosen so that if the level voltage between the +VB and RTN signals is at the maximum voltage level, the voltage appearing at the inverting input of the error amplifier 216 will be 5 volts. The output of the error amplifier 216 sinks current through the resistor 212 from the transistor 210. In this manner, the error amplifier 216 attempts to regulate the output voltage at the maximum voltage level by comparing the divided output between the resistors 220 and 222 with the 5 volt reference voltage.

A resistor 224 is connected between the inverting input of the error amplifier 216 and to one side of a capacitor 226. The other side of the capacitor 226 is connected to the output of the error amplifier 216. A capacitor 228 is connected between the inverting input and the output of the error amplifier 216. The resistor 224 and the capacitors 228 and 226 form a compensation network to roll-off the high frequency gain of the error amplifier 216. A diode 230 has its anode connected to the output of the error amplifier 216 and its cathode connected to the inverting input of the error amplifier 216. The diode 230 serves to limit the output voltage of the error amplifier 216 to a maximum level, which is preferably 5.7 volts, at which voltage the error amplifier 216 is considered saturated.

If the Ni-Cad battery 24 is installed and two other conditions are met, then the AC adapter 22 enters into the second mode of operation referred to as the regulated power mode (RPM). The first condition is that the Ni-Cad battery 24 is within the allowable temperature range for a fast charge, and the second condition is that the Ni-Cad battery 24 has not been fast charged since the AC adapter 22 has last been powered-up. The second condition above is determined by a latch circuit, described below, which is set once a fast charge cycle has been completed and is not reset until a new power-up cycle occurs or the Ni-Cad battery 24 is removed.

The temperature range comparison is achieved by using a pair of comparators 232 and 234, preferably implemented by low power, low offset voltage comparators such as the LM393 dual comparators manufactured by National Semiconductor. A resistor 236 is connected between the 5 volt output of the voltage regulator 204 and the non-inverting input of the high temperature comparator 232. A resistor 238 is connected between the non-inverting input of the high temperature comparator 232 and the inverting input of the low temperature comparator 234. A resistor 240 is connected between the inverting input of the low temperature comparator 234 and the RTN signal. The resistors 236, 238 and 240 form a voltage divider network to establish a low temperature reference voltage at the inverting input of the comparator 234 and a high temperature reference voltage at the non-inverting input of the comparator 232. In the first preferred embodiment, the low temperature reference voltage is approximately 0.5 volts corresponding to a temperature of 50° Fahrenheit (F.), and the high temperature reference voltage is approximately 1.04 volts corresponding to a temperature of 104° F.

A resistor 242 is connected between the +TS signal and the inverting input of the comparator 232 and a capacitor 244 is connected between the inverting input of the comparator 232 and the RTN signal. The inverting input of the comparator 232 is connected to the non-inverting input of the comparator 234. The resistor 242 and the capacitor 44 form a noise filter for the +TS temperature sense input voltage signal. A pull-up resistor 246 is connected between the 5 volt voltage regulator 204 output and the output of the comparator 232, and another pull-up resistor 248 is connected between the 5 volt output of the voltage regulator 204 and the output of the comparator 234. In this manner, the output of the comparator 234 will be low if the temperature of the Ni-Cad battery 24 is below 50° F., and the output of the comparator 234 will be high if the temperature of the Ni-Cad battery 24 is above 50° F. Similarly, the output of the comparator 232 will be low if the temperature of the Ni-Cad battery 24 is below 104° F., and the output of the comparator 232 will be high if the temperature of the Ni-Cad battery 24 is above 104° F. A pull-down resistor 249 is connected between the +TS and RTN signals so that if the +TS signal is somehow disconnected, it will float to a low level below both the high and low temperature reference voltages. This keeps the output of the comparator 234 low, the significance of which will be described below.

Four two-input NAND gates 250, 252, 254 and 256 perform the logic for the temperature sense circuit. The NAND gates 250, 252, 254 and 256 are preferably implemented by the MC74HC00 quad 2-input NAND gate manufactured by Motorola semiconductor. The NAND gates 250 and 252 are implemented as a latch such that the output of the NAND gate 250 is connected to the first input of the NAND gate 252, and the output of the NAND gate 252 is connected to the first input of the NAND gate 250. The output of the comparator 232 is connected to the second input of the NAND gate 252. A resistor 258 is connected between the output of the comparator 234 and the second input of the NAND gate 250, and a capacitor 260 is connected between the second input of the NAND gate 250 and the RTN signal. The output of the comparator 234 is connected to the ERROR- terminal of the voltage regulator 204, and also to the first input of the NAND gate 254. The output of the NAND gate 250 is connected to the second input of the NAND gate 254. The resistor 258 and the capacitor 260 form a power-on reset for the latch circuit formed by the NAND gates 250 and 252, and for the NAND gate 254. During power-up, the voltage regulator 204 holds its ERROR- terminal low until the output of the voltage regulator 204 stabilizes. This keeps the output of the NAND gate 250 high and the output of the NAND gate 254 high until all power-up voltage transients disappear. The output of the NAND gate 254 is connected to both inputs of the NAND gate 256, such that the NAND gate 256 acts like an invertor. A feedback resistor 262 is connected between the output of the NAND gate 254 and the inverting input of the comparator 234. The resistor 262 is used for positive feedback for the comparator 234.

The operation of the temperature sense control logic will now be described. During power up, the output of the comparator 234 is held low by the ERROR- terminal of the voltage regulator 204. When the output of the comparator 234 is low, the output of the NAND gate 254 is high which forces the output of the NAND gate 256 low. If the output of the NAND gate 256 is low, the reference voltage at the non-inverting input of the error amplifier 218 is set for trickle level. If the Ni-Cad battery 24 is connected, it will be trickle charging, wherein the current through the Ni-Cad battery 24 is maintained at a predetermined trickle current level. Recall also that if the +TS signal is disconnected so that it floats to a low level keeping the output of the comparator 234 low, the output of the NAND gate 256 will be forced low which keeps the reference voltage at the non-inverting input of the error amplifier 218 at the trickle level. If the Ni-Cad battery 24 is trickle charging, the AC adapter 22 enters a third mode which will be described in detail later.

If the Ni-Cad battery 24 is connected and is within the allowable temperature range so that the outputs of both the comparators 232 and 234 are high, and if the output of the NAND gate 250, which is also the output of the latch formed by the NAND gates 250 and 252, is high, then the output of the NAND gate 254 will be low and the output of the NAND gate 256 will be high. If the output of the NAND gate 256 is high, the AC adapter 22 is in the RPM mode of operation and the Ni-Cad battery 24 will be fast charged. Also, while the Ni-Cad battery 24 is fast charging, a fast charge indicator LED 290 is illuminated. A transistor 286 has its base connected to the output of the NAND gate 256 and its collector connected to the +VB signal. The emitter of the transistor is connected to one side of a resistor 288, and the other side of the resistor 288 is connected to the anode of the LED 290. The cathode of the LED 290 is connected to ground. Therefore, when the output of the NAND gate 256 is high, the transistor 286 is biased on allowing current to flow through the LED 290 and the LED 290 is illuminated. This indicates that the Ni-Cad battery 24 is fast charging. When the output of the NAND gate 256 is low, the transistor 286 is biased off so that the LED 290 is not illuminated.

As the Ni-Cad battery 24 is fast charging, its temperature rises. When the temperature of the Ni-Cad battery 24 reaches the maximum limit of the allowable temperature range, the Ni-Cad battery 24 is considered fully charged and the output of the comparator 232 goes low. When the output of the comparator 232 goes low, it causes the output of the NAND gate 252 to go high, forcing the output of the NAND gate 250 to go low. Since the output of the NAND gate 250 is connected to the first input of the NAND gate 252, when the NAND gate 250 goes low, it keeps the output of the NAND gate 252 high regardless of subsequent changes in the state of the output of the comparator 232. The output of the NAND gate 250 is now said to be latched low since it can only be set high again if the output of the comparator 234 goes low or if the ERROR- terminal of the voltage regulator 204 goes low. If the Ni-Cad battery 24 remains connected after the output of the NAND gate 250 is latched low while the AC source 20 is connected, the output of the comparator 234 is unlikely to go low since this would mean that the temperature of the Ni-Cad battery 24 would have to fall below 50° F. while it is being trickle charged. If the AC source 20 is removed and re-connected causing a power-up cycle, the ERROR- terminal of the voltage regulator 24 would cause the output of the NAND gate 250 to be reset high again.

The low output of the NAND gate 250 keeps the output of the NAND gate 254 high which, in turn, keeps the output of the NAND gate 256 low. Assuming the Ni-Cad battery 24 remains connected, once the output of the NAND gate 250 is latched low, the AC adapter 22 enters the third mode, described below, and remains in the third mode until the AC source 20 is removed. The operation of the AC adapter 22 in the RPM mode as described, changes little if a discharged Ni-Cad battery 24 is installed and the DC-DC converter 30 is off. In this case, the Ni-Cad battery 24 is charged at a very fast rate and absorbs all the energy provided by the AC adapter 22 not used by the DC-DC converter 30.

Once the Ni-Cad battery 24 is fully charged upon completion of a fast charge cycle, the AC adapter 22 enters the third mode referred to as the Regulated Current Mode (RCM). In the RCM mode of operation, the output power of the AC adapter 22 is controlled to maintain a pre-determined trickle current through the Ni-Cad battery 24. In the RCM mode, the current limit error amplifier 218 is in control of the output power. The error amplifier 218 monitors the current through the Ni-Cad battery 24 and varies its output to control the output power so that the trickle rate through the Ni-Cad battery 24 is maintained. The trickle rate keeps the Ni-Cad battery 24 fully charged and is preferably maintained at a nominal value of 90 milliamps plus or minus 27 milliamps (63 ma–117 ma). As long as the AC source 20 or the Ni-Cad battery 24 is not removed, the AC adapter 22 will remain in the RCM mode of operation.

A resistor 278 is connected to the inverting input of the error amplifier 218 and to one side of a capacitor 280. The other side of the capacitor 280 is connected to the output of the error amplifier 218. A capacitor 282 is connected between the inverting input and the output of the error amplifier 218. The resistor 278 and the capacitors 282 and 280 provide frequency compensation for the error amplifier 218. A PNP transistor 284 has its collector connected to the inverting input of the error amplifier 218. The emitter of the transistor 284 is connected to the output of the error amplifier 218 and the base of the transistor 284 is connected to the 5 volt output of the voltage regulator 204. The transistor 284 limits the output voltage of the error amplifier 218 to a preferable range of 0.4 to 5.7 volts. A shunt capacitor 272 is connected between the 5 volt output of the voltage regulator 204 and the RTN signal and acts to shunt high frequency noise from the output of the voltage regulator 204 to ground and away from the noninverting input of the error amplifier 218.

A resistor 264 is connected between the +CS signal and the inverting input of the error amplifier 218. The resistor 264 sets the gain and also balances the input offset currents of the error amplifier 218. A resistor 266 is connected between the RTN signal and the non-inverting input of the error amplifier 218, and a resistor 268 is connected between the non-inverting input of the error amplifier 218 and the 5 volt output of the voltage regulator 204. A resistor 270 is connected between the output of the NAND gate 256 and the non-inverting input of the error amplifier 218. The resistors 266, 268 and 270 form a summation and voltage divider network which defines the reference voltage at the non-inverting input of the error amplifier 218. In this manner, the state of the output of the NAND gate 256 determines the reference voltage appearing at the non-inverting input of the error amplifier 218. If the output of the NAND gate 256 is low, the reference voltage level is preferably set to 4.5 millivolts ±1.35 millivolts, which corresponds to the trickle rate of about 90 milliamps. If the output of the NAND gate 256 is high, the reference voltage level is preferably set to about 150 millivolts, which corresponds to a maximum current through the Ni-Cad battery 24 of about 3 amperes.

The output of the error amplifier 218 is the difference between the reference voltage at its non-inverting input and the current sense voltage from the +CS signal at its inverting input through the resistor 264 multiplied by the gain of the amplifier circuit of the error amplifier 218. The voltage between the output of the error amplifier 218 and the emitter of the transistor 210 determines the current through the resistor 214, which, in turn, affects the current through the LED 152. The current through the LED 152, as described before, defines the feedback signal to the PWM circuit 65. Recall that the error amplifier 216 works in a similar manner such that the sum of the currents through the resistors 212 and 214 from the transistor 210 determine the feedback signal to the PWM circuit 65.

In the RCM mode, the output of the NAND gate 256 is low so that the reference voltage at the non-inverting input of the error amplifier 218 is set to the trickle level. The Ni-Cad battery 24 is being trickle charged and absorbs a low amount of energy. The Ni-Cad battery 24 and the DC-DC converter 30 together require less power than the maximum output power of the AC adapter 22 in the RCM mode. The error amplifier 218 takes control of the output power, therefore, by manipulating the feedback signal to limit the output power to whatever level is necessary to maintain the trickle rate through the Ni-Cad battery 24. This is true even if the DC-DC converter 30 is turned off wherein the output power of the AC adapter 22 is maintained at a relatively low amount of power, just enough to trickle charge the Ni-Cad battery 24.

A resistor 274 is connected between the 5 volt output of the voltage regulator 204 and the +CS signal. Another resistor 276 is connected between ground and the RTN signal. The resistor 274 and 276 serve to identify and protect against the fault condition wherein the +CS signal is open circuited, in which case the inverting input of the error amplifier 218 floats high and the non-inverting input floats low; these conditions pull the output voltage low forcing the AC adapter 22 to autocycle.

The operation of the error amplifiers 216 and 218 will now be more fully described to facilitate a better understanding of the output control circuitry. If the Ni-Cad battery 24 is not connected, the output voltage of the AC adapter 22 rises and the error amplifier 216 takes control to limit the output from rising above the predetermined maximum voltage limit. The AC adapter 22 is thus in the RVM or regulated voltage mode of operation. At the same time, the voltage at the +CS signal will be below the reference voltage at the non-inverting input to the error amplifier 218. The output of the error amplifier 218, therefore, rises in an attempt to increase the power output of the AC adapter 22 to raise the +CS signal to equalize with the reference voltage at the non-inverting input of the error amplifier 218. Since the Ni-Cad battery 24 is not present and, therefore, not drawing current, the +CS signal will not rise, and the output of the error amplifier 218 saturates at about 5.7 volts. Since the voltage at the output of the error amplifier is greater than the voltage at the emitter of the transistor 210, current flows through the resistor 214 to the emitter of the transistor 210. The error amplifier 216 must lower its output voltage to sink the current from the error amplifier 218 and also to draw whatever current is required through the LED 152 to control the output voltage. The error amplifier 216 is, therefore, in control in the RVM mode and the error amplifier 218 is not.

In the RPM or regulated power mode of operation, the output of the NAND gate 256 is high so that the reference voltage at the non-inverting input of the error amplifier 218 is high. Since the reference voltage corresponds to a large charge current level through the Ni-Cad battery 24 of about 3 amps in the preferred embodiment, the error amplifier 218 raises its output to increase the output power of the AC adapter 22 to increase the current through the Ni-Cad battery 24. The AC adapter 22, however, will not supply this much power and so the output of the error amplifier 218 saturates to 5.7 volts. The output voltage of the AC adapter 22 also drops so that the error amplifier 216 also saturates to 5.7 volts. The feedback current through the LED 152 is essentially zero which corresponds to a high feedback error level. Therefore, when the AC adapter 22 is in the RPM mode, the PWM circuit 65 is in control and the AC adapter 22 outputs the maximum power to the Ni-Cad battery 24 and to the DC-DC converter 30. The output voltage of the AC adapter 22 will vary with the output current in the RPM mode.

When the Ni-Cad battery 24 is fully charged, the output of the NAND gate 256 goes high so that the reference voltage at the non-inverting input of the error amplifier 218 is set low to the trickle reference level. The AC adapter 22 is now in the RCM (regulated current) mode where the error amplifier 218 takes control of the loop and sets its output to whatever level it takes to keep the current through the Ni-Cad battery 24 to the trickle rate. The error amplifier 218 now operates to sink whatever current is being supplied by the error amplifier 216 and also to draw enough current through the LED 152 to control the output power. The error amplifier 218 is, therefore, in control of the output power of the AC adapter 22 in the RCM mode of operation.

One other circuit on the secondary board is a power-on indicator. A resistor 292 is connected between the +VB signal and the anode of an LED 294. The cathode of the LED 294 is connected to ground. When the AC adapter 22 is powered by the AC source 20, the output voltage of the AC adapter 22 appears between the +VB signal and ground. This output voltage causes a current to flow through the resistor 292 and the LED 294 and the LED 294 is illuminated, thus indicating that the power of the AC adapter 22 is on.

To summarize the modes of operation of the AC adapter 22, when the Ni-Cad battery 24 is not connected, the AC adapter 22 operates in the RVM mode wherein the output voltage is regulated at the predetermined maximum output voltage. If the Ni-Cad battery 24 is connected, discharged, and within the proper temperature range, the AC adapter 22 operates in the RPM mode wherein the output power is regulated at the predetermined maximum value. Once the Ni-Cad battery 24 is fully charged, the AC adapter 22 enters the RCM mode wherein the output of the AC adapter 22 is controlled to maintain a predetermined trickle current through the Ni-Cad battery 24.

Figure 4:
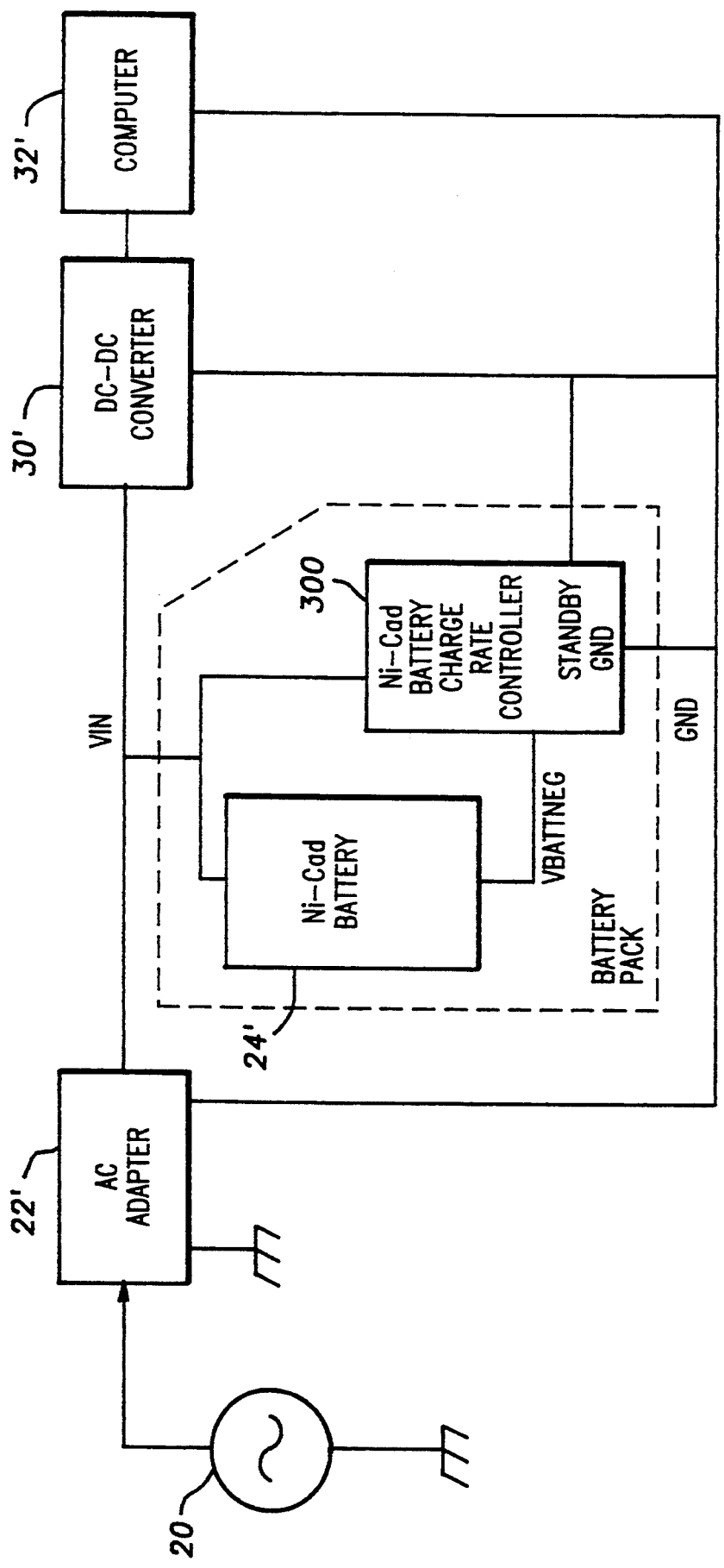
FIG. 4 is a block diagram of a computer system using a different Ni-Cad battery and a second embodiment of the AC adapter.

Referring now to FIG. 4, the AC source 20 is shown connected to a second preferred embodiment of the AC adapter of the present invention which will be referred to as the AC adapter 22'. The AC adapter 22' is similar to the AC adapter 22 and provides power to another DC-DC converter 30' and to charge a Ni-Cad battery 24'. The AC adapter 22' converts the AC voltage from the AC source 20 to a DC voltage between a VIN signal and ground. The DC-DC converter 30' is connected between the VIN signal and ground and a computer 32' is connected to the output of the DC-DC converter 30'. The AC adapter 22' of the second preferred embodiment does not contain circuitry to monitor the charge current and temperature of the Ni-Cad battery 24'. Instead, these functions are contained within a separate Ni-Cad battery charge rate controller circuit 300 which is connected between the VIN signal and ground. The operation of this charge rate controller is detailed in U.S. patent application Ser. No. 596,223, filed Oct. 12, 1990 and entitled "Ni-Cad Battery Charge Rate Controller," assigned to the same assignee as this invention and hereby incorporated by reference. The Ni-Cad battery 24' has its positive terminal connected to the VIN signal, which is analogous to the +VB signal in the first embodiment, and has its negative terminal, referred to as VBATTNEG, connected to the Ni-Cad battery charge rate controller 300.

Preferably, the Ni-Cad battery charge rate controller 300 and the Ni-Cad battery 24' are combined in a single physical unit referred to as a battery pack. The Ni-Cad battery charge rate controller 300 includes a signal referred to as STANDBY, which is used by the controller 300 to reduce the controller's own power consumption when the battery pack, containing the Ni-Cad battery 24' and the Ni-Cad battery charge rate controller 300, are removed from the computer 32' in order to conserve energy and extend the life of the Ni-Cad battery 24'. When the battery pack is installed, the STANDBY signal is connected to GND to enable the Ni-Cad battery 24' 300 to operate normally. As will be described in further detail below, the AC adapter 22' works in a similar manner as the AC adapter 22 to provide power to operate the DC-DC converter 30' and to charge the Ni-Cad battery 24'.

Figure 5:
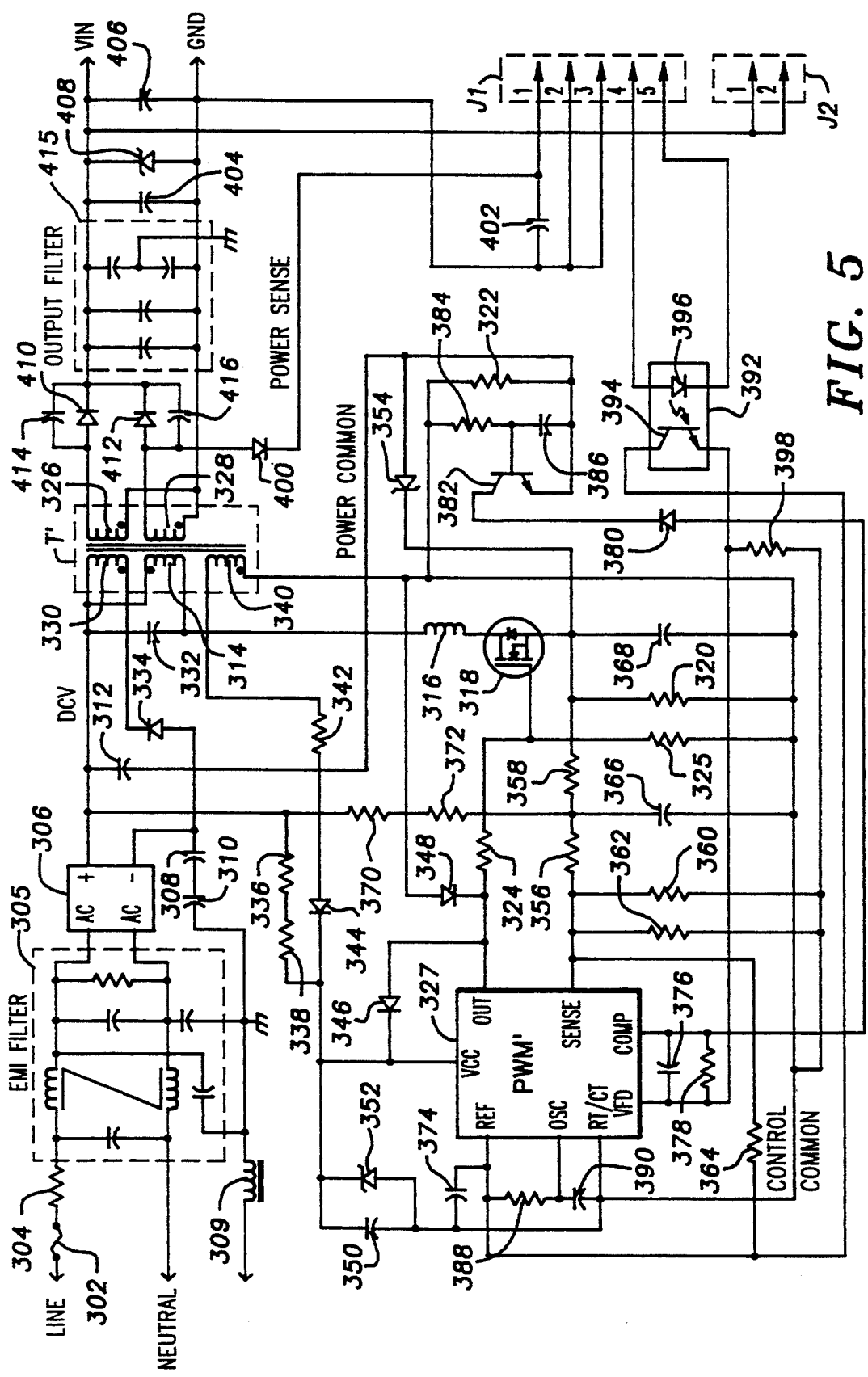
FIG. 5 is an electrical schematic diagram of portions of the AC adapter of FIG. 4.

FIG. 5 is a more detailed electrical schematic of the primary board of the second preferred embodiment of the AC adapter 22' illustrating the maximum power regulated method. The LINE, NEUTRAL and EARTH GND terminals of the AC source 20 are shown as the inputs to the AC adapter 22'. The LINE terminal is connected to one side of a fuse 302 and the other side of the fuse 302 is connected to a thermistor 304. The other side of the thermistor 304 is connected to the line input of an EMI filter 305. The NEUTRAL terminal of the AC source 20 is connected to the neutral input of the EMI filter 305. The EARTH GND terminal is connected to one side of a ground inductor 309, and the other side of the ground inductor 309 is connected to the chassis of the AC adapter 22'. The thermistor 304 is used to limit input surge current. The EMI filter 305 protects the AC adapter 22' from outside conducted noise and keeps noise generated within the AC adapter 22' from being conducted to the AC source 20. The two outputs of the EMI filter 305 are connected across the two AC inputs of a fullwave bridge rectifier 306. The output of the bridge rectifier 306 is a pulsating DC voltage. The positive output terminal of the rectifier 306 will be referred to as DCV and is an unregulated DC source voltage. The negative terminal of the bridge rectifier 306 is called the POWER COMMON signal. Two filter capacitors 308 and 310 are connected in series between POWER COMMON and the chassis. An input filter capacitor 312 is connected between the DCV signal and POWER COMMON and converts the pulsating DC voltage into an unregulated DC voltage.

The DCV signal is connected to a dotted terminal of a primary winding 314 of a transformer T'. The undotted terminal of the primary winding 314 is connected to a saturable inductor 316 and the other side of the saturable inductor 316 is connected to the drain terminal of a switching transistor 318. The source terminal of the switching transistor 318 is connected to a sense resistor 320 and the other side of the sense resistor 320 is connected to a signal referred to as CONTROL COMMON. A resistor 322 is connected between CONTROL COMMON and POWER COMMON. The gate terminal of the switching transistor 318 is connected to a resistor 324 and the other side of the resistor 324 is connected to the output terminal of a PWM controller integrated circuit 325. The PWM device 327 in the present embodiment is preferably an IPS3845 current mode SMPS controller manufactured by Seagate Components. A resistor 325 is connected between the output terminal of the PWM device 327 and CONTROL COMMON. PWM device 327 turns on and off the switching transistor 318, which causes current to flow between the DCV signal through the primary winding 314 through the inductor 316 and through the sense resistor 320. The purpose of the resistor 322 which separates POWER COMMON and CONTROL COMMON will be described below. The energy from this current flow is stored in the primary winding 314 of the transformer T'. When the PWM device 327 turns the switching transistor 318 off, this energy is transferred to the output of the AC adapter 22' through two secondary windings 326 and 328 of the transformer T'. The dotted terminals of the secondary windings 326 and 328 of the transformer T' are connected together and connected to ground. The undotted terminal of the secondary winding 326 is connected to the anode of a diode 410. The undotted terminal of the secondary winding 328 is connected to the anode of diode 412. The cathodes of the diodes 410 and 412 are connected together to the VIN signal. A filter capacitor 414 is connected in parallel with the diode 410 and another filter capacitor 416 is connected in parallel with the diode 412. An OUTPUT filter 415 is connected between the VIN signal and ground.

Another primary inductance 330 of the transformer T' is wired out of phase with the primary winding 314. The undotted terminal of the primary winding is connected to the DCV signal and the dotted terminal is connected to the cathode of a diode 334. The anode of the diode 334 is connected to POWER COMMON. A capacitor 332 is connected across the dotted and undotted terminals of the primary winding 314. The primary winding 330, the diode 334, the capacitor 332 and the inductor 316 form a snubber and clamp circuit to reduce the power stress of the switching transistor 318. Details of operation of the snubber and clamp circuit are provided in U.S. patent application, Ser. No. 596,233, assigned to the same assignee as this invention, which is hereby incorporated by reference. The DCV signal is connected to one side of a resistor 336 and the other side of the resistor 336 is connected to a resistor 338. The other side of the resistor 338 is connected to the VCC terminal of the PWM device 327. The GND terminal of the PWM device 327 is connected to CONTROL COMMON. The unregulated DC voltage at the DCV signal supplies power to the PWM device 327 at the initial or startup stages of the AC adapter 22'. The dotted terminal of another primary winding 340 is connected to CONTROL COMMON and the undotted terminal of the primary winding 340 is connected to one side of a resistor 342. The other side of the resistor 342 is connected to the anode of a diode 344 and the cathode of the diode 344 is connected to the VCC terminal of the PWM device 327. The winding 340 is also wired out of phase with the primary winding 314. Once the AC adapter 22' begins to operate normally, the transformer T' supplies power to the PWM device 327 through the winding 340. The diode 344 is a half wave rectifier to prevent negative voltage from reaching the PWM device 327.

The anode of a diode 346 is connected to the output terminal of the PWM device 327 and the cathode of the diode 346 is connected to the VCC terminal of the PWM device 327. The diode 346 protects the PWM device 327 by clamping the output of the PWM device 327 to the VCC input terminal. In this way, if the switching transistor 318 is shorted, the output of the PWM device 327 will not rise above the VCC terminal voltage of the PWM device 327.

The anode of a diode 348 is connected to the CONTROL COMMON signal and the cathode of the diode 348 is connected to the output terminal of the PWM device 327. The diode 348 protects the PWM device 327 by not allowing the output voltage of the PWM device 327 from going below the CONTROL COMMON voltage level. A capacitor 350 is connected between the VCC and the GND terminals of the PWM device 327 to filter the supply voltage to the PWM device 327 and to supply the drive current for the switching transistor 318. The anode of a Zener diode 352 is connected to the GND terminal and the cathode is connected to the VCC terminal of the PWM device 327 to protect the PWM device 327 from high voltage. A Zener diode 354 has its anode connected to POWER COMMON and its cathode connected to the source terminal of the transistor 318 and acts to protect the PWM device 327.

A resistor 356 is connected to the ISENSE terminal of the PWM device 327 and the other side of the resistor 356 is connected to one side of a resistor 358. The other side of the resistor 358 is connected to the source terminal of the switching transistor 318. Power trim resistors 360 and 362 are connected in parallel between the ISENSE terminal of the PWM device 327 and CONTROL COMMON. A power trim resistor 364 is connected between the ISENSE terminal and the VREF terminal of the PWM device 327. The values of the resistors 360, 362 and 364 are set so that the voltage at the ISENSE terminal of the PWM device 327 is very precise. When the switching transistor 318 is turned on, current flows through the sense resistor 320, establishing a voltage across the sense resistor 320 which is sensed at the ISENSE input of the PWM device 327 through the voltage divider formed by the resistors 358, 356, 362 and 360.

One side of a capacitor 366 is connected to the junction between the resistors 356 and 358 and the other side of the capacitor 366 is connected to CONTROL COMMON. Another capacitor 368 is connected in parallel with the sense resistor 320. The capacitors 366 and 368 are filter capacitors for the ISENSE terminal of the PWM device 327. A resistor 370 is connected to the DCV signal and to one side of a resistor 372. The other side of the resistor 372 is connected to the junction between the resistors 356 and 358. The resistors 370 and 372 serve as feed forward compensation such that if the voltage level of the DCV signal changes, the current sense monitor of the PWM device 327 at the ISENSE terminal will change to counteract the change in the DCV signal.

A capacitor 376 and a resistor 378 are connected between the VFB and COMP terminals of the PWM device 327. The capacitor 376 and the resistor 378 provide negative feedback for an internal error amplifier in the PWM device 327 to provide compensation for the voltage feedback loop sensed at the VFB terminal of the PWM device 327. The filter capacitors 366 and 368 slow down the current feedback loop such that the PWM 327 overcurrent protection function is not completely adequate. If the output of the AC adapter 22' were shorted, for example, the AC adapter 22' would be damaged unless a quicker way to shut down the PWM device 327 is provided. A diode 380, an NPN transistor 382, a resistor 384 and a capacitor 386 as well as the resistor 322 provide the necessary means to detect this over-current situation and quickly shut down the PWM device 327. The COMP terminal of the PWM device 327 is connected to the anode of the diode 380 and the cathode of the diode 380 is connected to the collector of the transistor 382. The emitter of the transistor 382 is connected to POWER COMMON. The resistor 384 is connected between CONTROL COMMON and the base of the transistor 382. One side of the capacitor 386 is connected to the base of the transistor 382 and the other side of the capacitor 386 is connected to POWER COMMON. If the current demand at the output of the AC adapter 22' suddenly increases above an allowable level, the voltage across the resistor 322 increases and biases the transistor 382 on, which clamps the COMP terminal of the PWM device 327 to POWER COMMON plus the forward bias of the diode 380. This will shut down the output pulses of the PWM device 327.

A resistor 388 is connected between the VREF and RT/CT inputs of the PWM device 327. A capacitor 390 is connected between the RT/CT and GND terminals of the PWM device 327. The resistor 388 and the capacitor 390 determine the frequency at which the PWM device 327 switches the transistor 318. This switching frequency is preferably set to about 60 kHz. A filter capacitor 374 is connected between the VREF and GND terminals of the PWM device 327. An opto-coupler 392 senses a feedback signal from an output control circuit, described below, and converts this signal into a signal to be used by the PWM device 327 to control the output power of the AC adapter 22'. The opto-coupler 392 has an internal transistor 394, the collector of which is connected to the VREF terminal of the PWM device 327. The emitter of the transistor 394 is connected to the VFB terminal of the PWM device 327. A resistor 398 is connected between the VFB terminal and CONTROL COMMON. A light emitting diode (LED) 396 has its anode connected to terminal 4 of a connecter J1. The cathode of the LED 396 is connected to terminal 5 of the connector J1. A diode 400 has its anode connected to the undotted terminal of the secondary winding 328 and the cathode of the diode 400 is connected to terminal 1 of the connector J1. A capacitor 402 is connected between the cathode the diode 400 and ground. The diode 400 rectifies the voltage appearing across the secondary coil 328 to create a voltage for the secondary board of the AC adapter 22'. This voltage at terminal 1 of the connector J1 will be referred to as POWER SENSE. The capacitor 402 filters the POWER SENSE signal. Terminals 2 and 3 of the connector J1 are connected to ground. Two filter capacitors 404 and 406 are connected between the VIN signal and ground. A Zener diode 408 has its anode connected to ground and its cathode connected to the VIN signal. The VIN signal is connected to terminals 1 and 2 of a connector J2. The connectors J1 and J2 connect the primary board of the AC adapter 22' to the secondary board wherein the secondary board contains the control circuitry which determines the feedback signal through the LED 396.

Figure 6:
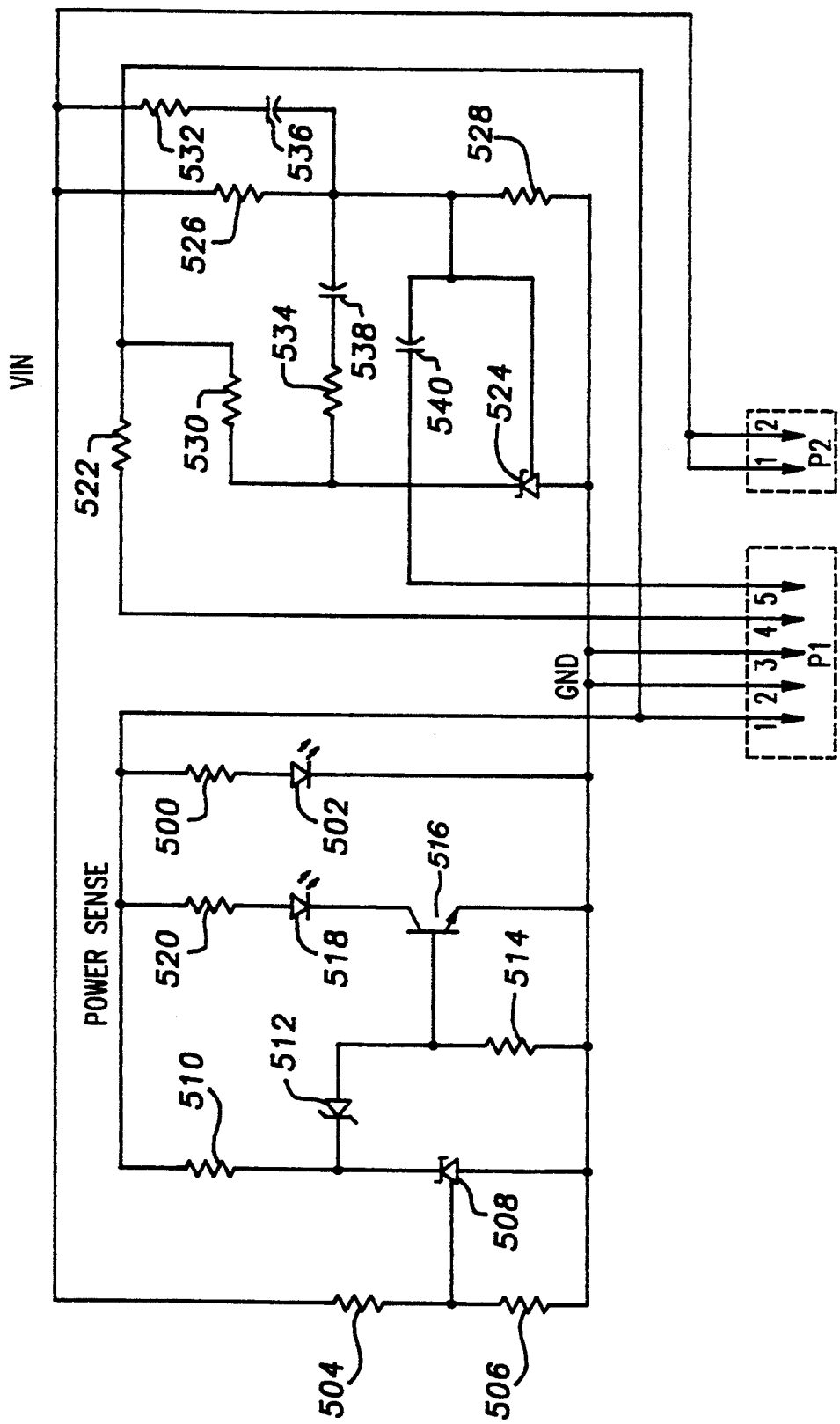
FIG. 6 is an electrical schematic diagram of further portions of the AC adapter of FIG. 4.

The secondary board of the AC adapter 22' is shown in FIG. 6. The terminals 1-5 of the connector J1 on the primary board of FIG. 5 are connected to the respective terminals 1-5 of a connector P1 in FIG. 6. Likewise, the terminals 1 and 2 of the connector J2 on the primary board is connected to the terminals 1 and 2 of a connector P2 on the secondary board. In this manner, terminal 1 of the connector P1 is connected to the POWER SENSE signal. Terminals 2 and 3 of the connector P1 are connected to ground. Terminals 4 and 5 of the connector P1 are connected to the LED 396. Terminals 1 and 2 of the connector P2 are connected the VIN signal.

A resistor 500 is connected between the POWER SENSE signal and the anode of an LED 502. The cathode of the LED 502 is connected to ground. The LED 502 is a power-on indicator such that if the AC power source 20 is connected to the AC adapter 22', a voltage will appear at the POWER SENSE signal which will activate and cause the LED 502 to be illuminated. A resistor 504 is connected between the VIN signal and to one side of a resistor 506 and the other side of the resistor 506 is connected to ground. The values of the resistors 504 and 506 are chosen so that if the output voltage between the VIN signal and ground is about 27 volts, the voltage at the junction of the resistors 504 and 506 will preferably be about 2.5 volts. The reference voltage of 2.5 volts between the resistors 504 and 506 is connected to the reference terminal of a programmable precision reference device 508. The function performed by the reference device 508 could be performed by a typical comparator well known to those skilled in the art. This function, however, is preferably performed by the TL431 programmable precision reference, manufactured by Motorola semiconductor. The anode of the reference device 508 is connected to ground and its cathode is connected to one side of a resistor 510. The cathode of the reference device 508 is an open collector and will sink current if the voltage at its reference terminal rises above 2.5 volts. If the voltage at the reference terminal is below 2.5 volts, the cathode of the reference device 508 appears as a high impedance.

The other side of the resistor 510 is connected to the POWER SENSE signal. A Zener diode has its cathode connected to the cathode of the reference device 508 and its anode connected to the base of a transistor 516. A resistor 514 is connected between the base of the transistor 516 and ground. The collector of the transistor 516 is connected to the cathode of a fast-charge indicator LED 518 and the anode of the LED 518 is connected to one side of a resistor 520. The other side of the resistor 520 is connected to the POWER SENSE signal. If the voltage between the VIN signal and ground falls below 27 volts, the cathode of the reference device 508 appears as a high impedance such that it does not draw much current. Therefore, current will flow from the POWER SENSE signal through resistor 510, through the Zener diode 512, through the resistor 514 and into the base of the transistor 516. This biases the transistor 516 on which allows current to flow from the POWER SENSE signal through the resistor 520 and through the LED 518 such that the LED 518 will be illuminated. In this manner when a discharged Ni-Cad battery 24' is installed into the AC adapter 22', the output voltage of the AC adapter 2' falls to a level below 27 volts such that the LED 518 is illuminated. The LED 518 is considered a fast- charge LED since, as described below, whenever the output voltage is pulled low, the Ni-Cad battery 4' will be fast charged. When the output voltage rises above 27 volts, the reference device 508 sinks the current through the resistor 510 away from the Zener diode 512 which turns off the transistor 516. The LED 518 will not be illuminated when the VIN signal is above 27 volts, indicating that the Ni-Cad battery 24' is not being fast charged.

A resistor 522 is connected between terminals 1 and 4 of the connector P1. Terminal 5 of the connector P1 is connected to the cathode of another reference device 524 which is preferably similar to the reference device 508. The anode of the reference device is connected to ground. A resistor 526 is connected between the VIN signal and to one side of a resistor 528 and the other side of the resistor 528 is connected to ground. A bleeder resistor 530 is connected between the POWER SENSE signal and the cathode of the reference device 524 and serves to keep the reference device 524 active. The reference terminal of the reference device 524 is connected to the junction between resistors 528 and 526. The values of the resistors 526 and 528 are chosen such that if the voltage of the output between the VIN signal and ground is 30 volts, then the voltage at the junction between the resistors 526 and 528 is preferably about 2.5 volts. In this manner, the reference device 524 attempts to regulate the output voltage at about 30 volts. If the output voltage falls below 30 volts, the reference device 524 will attempt to raise the output voltage by sinking less current through the LED 396. When the output voltage falls below 30 volts, the AC adapter 22' is in a regulated power mode of operation. If the output voltage of the AC adapter 22' attempts to rise above 30 volts, the reference device 524 will sink more current through the LED 396 which will regulate the output voltage at the maximum level, which is preferably about 30 volts. When this occurs, the AC adapter 22' enters a regulated voltage mode of operation.

Two resistors 532 and 534 and three capacitors 536, 538 and 540 are added to compensate the feedback loop to stabilize the AC adapter 22'. The resistor 532 is connected to the VIN signal and to one side of the capacitor 536, and the other side of the capacitor 536 is connected to the reference terminal of the reference device 524. The resistor 534 is connected between the cathode of the reference device 524 and one side of the capacitor 538. The other side of the capacitor 538 and one side of the capacitor 540 are connected to the reference terminal of the reference device 524. The other side of the capacitor 540 is connected to the cathode of the reference device 524.

The operation of the AC adapter 22' will now be described for a better understanding of the second preferred embodiment of the present invention. Similar to the AC adapter 22 of the first embodiment, the output power of the AC adapter 22' is determined by the term $\frac{1}{2}Li^2f$, where f is the switching frequency, i is the peak current in the primary winding 314 and L is the inductance of the primary winding 314 of the transformer T'. The PWM device 327 toggles the switching transistor 318 at a constant frequency of preferably 60 kHz. The inductance of the primary winding 314 is constant, and is preferably about 590 $\mu$H. The peak current i may vary as described below, but is limited to a predetermined maximum level. The output power of the AC adapter 22' is, therefore, regulated to a maximum output power level, which is preferably between 30 and 35 watts, when the current i is at the predetermined maximum level.

The feedback signal through the LED 396 is sensed by the PWM device 327 at its VFB terminal. The feedback signal is inverted by an internal error amplifier of the PWM device 327 such that as the voltage of the feedback signal decreases, the inverted signal increases. This inverted feedback signal is, however, internally limited to a maximum level which corresponds to the maximum output power of the AC adapter 22'. The PWM device 327 operates by setting its output high at the beginning of each cycle of the PWM device 327 frequency. The output pulse is terminated, or pulled low, during each cycle when the voltage at the ISENSE terminal of the PWM device 327 becomes equal to the inverted feedback signal. Since the voltage at the ISENSE terminal follows the peak current through the primary winding 314, and since the level of the peak current determines the output power of the AC adapter 22' since f and L are constant, the feedback signal indirectly controls the output power up to the maximum power level.

The secondary board of the AC adapter 22' attempts to regulate the output to the maximum output voltage level, which is preferably 30 volts. When the load at the output is such that the voltage falls below the maximum voltage level, the AC adapter 22 provides the predetermined maximum power to the load. If the load decreases, causing a rise in output voltage above the maximum voltage level, the secondary board takes control through the feedback signal and controls the peak current through the primary coil 314 in order to regulate the voltage at the maximum voltage level.

The Ni-Cad battery charge rate controller 300 contains the circuitry to monitor the charge current and temperature of the Ni-Cad battery 24'. The Ni-Cad battery charge rate controller 300 operates very similarly to the temperature and current monitoring circuitry of the AC adapter 22. The Ni-Cad battery charge rate controller 300 will force the Ni-Cad battery 24' to trickle charge if the temperature of the Ni-Cad battery 24' is outside the allowable temperature range. The Ni-Cad battery 24' will also be trickle charged if the battery voltage, which is the voltage between the VIN and VBATTNEG signals, falls below the predetermined minimum level of preferably about 16.9 volts. If the Ni-Cad battery 24' is in the allowable temperature and voltage range and has not been previously fast charged since the last power-up of the AC adapter 22', then the Ni-Cad battery charge rate controller 300 will allow fast charging of the Ni-Cad battery 24'.

When the Ni-Cad battery charge rate controller 300 determines that the Ni-Cad battery 24' should be fast charged, it essentially couples the Ni-Cad battery 24' to the output of the AC adapter 22' such that the level of output voltage of the AC adapter 22' is pulled down to about the level of the voltage of the Ni-Cad battery 24'. The AC adapter 22' therefore goes into the regulated power mode and delivers constant power at the preferred maximum power level of 30 watts. The DC-DC converter 30' uses whatever power it requires and the remaining power is absorbed by the Ni-Cad battery 24'. Again, as in the first embodiment, the Ni-Cad battery 24' effectively controls the output voltage, with the current being determined based on this voltage and the constant power limit. As the voltage increases due to Ni-Cad battery 24' charging, the current decreases in proportion as the power is constant, until the voltage regulated mode is entered.

After the Ni-Cad battery 24' has completed its fast charge cycle, or any time that the Ni-Cad battery charge rate controller 300 determines that the Ni-Cad battery 24' should be trickle charged, the Ni-Cad battery charge rate controller 300 limits the current through the Ni-Cad battery 24' to a maximum trickle current level, which is preferably about 20 milliamps. The voltage at the VBATTNEG signal rises such that the output voltage of the AC adapter 22' is no longer limited to the voltage of the Ni-Cad battery 24' during trickle charging. Therefore, whenever the Ni-Cad battery 24' is trickle charging, the AC adapter 22' enters into the regulated voltage mode where the output voltage is regulated at the maximum voltage level. During the regulated voltage mode, the current through the Ni-Cad battery 24' is regulated at the trickle charge rate and the DC-DC converter 30' draws whatever current is necessary to meet its power requirements.

The primary difference between the AC adapter 22' of the second preferred embodiment from the AC adapter 22 of the first embodiment is that the AC adapter 22' does not have a regulated current mode of operation. The AC adapter 22' instead has only two modes of operation. Whenever the Ni-Cad battery 24' is fast charging, the AC adapter 22' is in the regulated power mode wherein the output power of the AC adapter 22' is limited to its maximum output power level. Whenever the Ni-Cad battery 24' is not connected or trickle charging, the AC adapter 22' enters the regulated voltage mode wherein the output power of the AC adapter 22' is controlled in order to regulate the output voltage to its maximum voltage level.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. An AC adapter having an output for providing DC power to a substantially constant power load which can be selectively enabled or disabled, having a maximum load value and being substantially constant above a lower voltage level and to charge a battery, where the load and the battery are each electrically coupled to the output, and the battery is removably connected to the circuit and has a fully charged voltage level, comprising:

power regulated source means having an output power control input, an output power sense output and a voltage output having a positive terminal and a negative terminal, wherein the positive terminal of the battery and the load are connected to said positive terminal of said voltage output, the negative terminal of the load is connected to said negative terminal of said voltage output, and the negative terminal of the battery is coupled to said negative terminal of said voltage output, wherein said voltage output provides the AC adapter output, for providing up to a predetermined maximum power level to the substantially constant load and the battery, said power regulated source means predetermined maximum power level exceeding the maximum load provided by the substantially constant load, such that the battery absorbs the remaining power supplied by said power regulated source means and said predetermined maximum power level being less than the battery fully charged voltage level times the current drawn by the substantially constant power load at the lower voltage level; and means having a sense input and a control output, said control output connected to said output power control input and said sense input connected to said output power sense output, for controlling the voltage output of said power regulated source means, said control means including means for limiting the output power provided by said power regulated source means to said predetermined maximum power level when the battery is in a condition for rapid charging and the total load presented to said power regulated source means by the battery and the substantially constant power load would otherwise cause the power output by said power regulated source means to exceed said predetermined maximum power level.

2. The circuit of claim 1, wherein the battery is a Nickel-Cadmium battery.

3. The circuit of claim 1, wherein said power regulated source means includes:

DC source voltage means having a positive terminal and a negative terminal;

a transformer having a primary inductance having a first terminal and a second terminal and having a secondary inductance having a first terminal and a second terminal, where said first terminal of said primary inductance is coupled to said positive terminal of said DC source voltage means;

a transistor having an input terminal, an output terminal and a control terminal, said input terminal coupled to said second terminal of said primary inductance of said transformer, said control terminal providing said output power control input; and means coupled between said output terminal of said transistor and said negative terminal of said DC source voltage means for converting the level of current through said primary inductance of said transformer into a proportional voltage, said proportional voltage providing said output power sense output.

4. The circuit of claim 3, wherein said transistor is a metal-oxide-semiconductor field-effect transistor having a drain terminal as said input terminal, a source terminal as said output terminal, and a gate terminal as said control terminal.

5. The circuit of claim 3, wherein said current to proportional voltage conversion means comprises a resistor.

6. The circuit of claim 1, wherein said means for controlling the voltage output of said power regulated source means includes:

means for generating an oscillating signal having a constant predetermined frequency;

activation means coupled to said oscillating signal means, said output power control input and said output power sense output, for providing a signal to said output power control input at the beginning of each cycle of said constant predetermined frequency, and for removing said signal to said output power control input if the level of said output power sense output reaches a predetermined maximum level.

7. The circuit of claim 6, wherein said activation means includes:

means having a feedback input for removing said signal to said output power control input when the level of said output power sense output becomes substantially equal to the lesser of the level of said feedback input and said output power sense output predetermined maximum level; and means coupled to said power regulated source means voltage output and having a voltage feedback output connected to said feedback of said activation means, for providing a voltage feedback output level to limit the voltage output of said power regulated source means to a predetermined maximum voltage level when the load presented to said power regulated source means would otherwise cause the voltage provided by said power regulated source means to exceed said predetermined maximum voltage level if said predetermined maximum power were provided.

8. The circuit of claim 7, wherein said voltage output limit means includes:

means for dividing the level of said voltage output for providing a proportional voltage signal;

means for producing a reference voltage having a level corresponding to a desired voltage output level; and means coupled to said proportional voltage signal means, said reference voltage signal means and said feedback input, for amplifying any difference between said proportional voltage signal and said reference voltage, for providing a signal to said feedback input indicative of the level of error between the voltage of said voltage output and said desired voltage level.

9. The circuit of claim 8, wherein said amplifying means comprises an error operational amplifier having two input terminals and one output terminal, said proportional voltage signal connected to one input terminal of said error amplifier, said reference voltage connected to the other input terminal of said error amplifier, and said output terminal of said error amplifier providing said signal indicative of the error between the voltage of said voltage output and said desired voltage level.

10. The circuit of claim 7, further comprising:
means for monitoring the battery temperature;
means for monitoring the battery current; and
current limit means coupled to said battery temperature monitoring means, said battery current monitoring means and said feedback input, for providing a current feedback output level to regulate the current provided to the substantially constant power load and the battery to maintain a predetermined trickle current level above the current required by the substantially constant power load when the battery temperature is not within allowable limits or after the battery has been discharged and then charged such that the battery temperature exceeds a predetermined high temperature level.

11. The circuit of claim 10, wherein said battery temperature monitoring means includes means for converting the battery temperature into a voltage signal having a level indicative of the battery temperature.

12. The circuit of claim 11, wherein said means for converting the battery temperature into said voltage signal includes a temperature sensor in good thermal contact with the battery, said temperature sensor having an output terminal which outputs said battery temperature voltage signal.

13. The circuit of claim 10, wherein said means for monitoring battery current includes a resistor connected in series in the battery charge path.

14. The circuit of claim 10,
wherein said means for monitoring the battery temperature produces an output voltage having a level indicative of the sensed temperature;
wherein said voltage output limit means includes:
means for dividing the level of said voltage output for providing a proportional voltage signal;
means for producing a reference voltage having a level corresponding to a desired voltage output level; and
means coupled to said proportional voltage signal means, said reference voltage signal means and said feedback input, for amplifying any difference between said proportional voltage signal and said reference voltage, for providing a signal to said feedback input indicative of the level of error between the voltage of said voltage output and said desired voltage level; and
wherein said current limit means includes:
means for producing a plurality of reference voltages;

means for comparing said battery temperature voltage signal with a first reference voltage, wherein said first reference voltage has a level that corresponds to a low battery temperature, for providing a signal indicative of low temperature of the battery;

means for comparing said battery temperature voltage signal with a second reference voltage, wherein said second reference voltage has a level that corresponds to a high battery temperature, for providing a signal indicative of high temperature of the battery;

latch means connected to said low battery temperature signal and said high battery temperature signal for providing a fast charge complete signal indicative of a condition wherein said battery temperature voltage signal rises above said second reference voltage;

means connected to said low battery temperature signal and said fast charge complete signal for providing a fast charge allowable signal indicative of allowable fast charging conditions;

means connected to said fast charge allowable signal means for providing a battery current reference voltage having a first level corresponding to said predetermined trickle current level and a second level corresponding to said maximum current limit, wherein if said fast charge signal is low, said battery current reference voltage is at said first level, and if said fast charge signal is high, said battery current reference voltage is at said second level;

means for converting the battery current into a voltage signal having a level indicative of the battery current; and means for amplifying any difference between said battery current reference voltage and said battery current voltage signal, for providing a voltage signal indicative of the level of error between the battery current and either said predetermined trickle current level or said maximum current limit.

15. The circuit of claim 14, wherein said amplifying means comprises an error operational amplifier having two input terminals and one output terminal, said proportional voltage signal connected to one input terminal of said error amplifier, said reference voltage connected to the other input terminal of said error amplifier, and said output terminal of said error amplifier providing said signal indicative of the error between the voltage of said voltage output and said high voltage level.

16. The circuit of claim 14, wherein said low battery temperature comparing means comprises a first comparator having two input terminals and an output terminal, wherein said first reference voltage is connected to one of said two input terminals and said battery temperature voltage signal is connected to the other of said two terminals;

wherein said high battery temperature comparing means comprises a second comparator having two input terminals and an output terminal, wherein said second reference voltage is connected to one of said two input terminals and said battery temperature voltage signal is connected to the other of said two input terminals; and wherein said fast charge allowable signal means comprises a gate having two input terminals and one output terminal, said fast charge complete signal connected to one input of said gate and said output of said first comparator connected to the other input terminal of said gate, and said output terminal of said gate providing said signal indicative of said allowable fast charging conditions.

17. The circuit of claim 14, wherein said means for monitoring battery current includes a resistor connected in series in the battery charge path.

18. The circuit of claim 14, wherein said amplifying means comprises an error operational amplifier having two input terminals and one output terminal, said battery current reference voltage connected to one input terminal of said error amplifier, said battery current voltage signal connected to the other input terminal of said error amplifier, and said output terminal of said error amplifier for providing said voltage signal indicative of the level of error between the battery current and either said predetermined trickle current level or said maximum current limit.

19. A method of providing power from a regulated power source to a substantially constant power load which can be selectively enabled or disabled, having a predetermined maximum load level and being substantially constant above a lower voltage level and to charge a removably connected battery having a fully charged voltage level, wherein the battery and the load are electrically coupled in parallel, comprising the steps of:
impressing the output of the regulated power source across the battery and the load;
sensing the output voltage of the regulated power source;
controlling the regulated power source to provide up to a predetermined maximum power level, wherein said predetermined maximum power level exceeds the predetermined maximum load level of the substantially constant power load and said predetermined maximum power level is less than the battery fully charged voltage level times the current drawn by the substantially constant power load at the lower voltage level; and
limiting the output power of the regulated power source to regulate the output voltage at a predetermined maximum voltage level when the total load presented by the load and the battery would otherwise cause the voltage provided by the regulated power source to exceed said predetermined maximum voltage level.

20. A method of providing power from a regulated power source to a substantially constant power load which can be selectively enabled or disabled, having a predetermined maximum load level and being substantially constant above a lower voltage level and to charge a removably connected battery having a fully charged voltage level, wherein the battery and the load are electrically coupled in parallel, comprising the steps of:
impressing the output of the regulated power source across the battery and the load;
sensing the output voltage of the regulated power source;
sensing the current through the battery;
sensing the temperature of the battery;
controlling the regulated power source to provide a predetermined maximum power level wherein said predetermined maximum power level exceeds the predetermined maximum load level of the substantially constant power load and said predetermined maximum power level is less than the battery fully charged voltage level times the current drawn by the substantially constant power load at the lower voltage level;
limiting the output power of the regulated power source to regulate the output voltage at a predetermined maximum voltage level when the battery is not connected or when the battery is connected and the battery voltage is substantially equal to said predetermined maximum output voltage level; and
limiting the output power of the regulated power source to regulate the current through the battery at a predetermined trickle level when the temperature of the battery is not within allowable limits or when the battery has been discharged and then charged such that the temperature of the battery exceeds a predetermined high temperature level.

21. An AC adapter having an output for charging a Nickel-based battery electrically coupled to the output, comprising:
means for monitoring the battery temperature;
means for monitoring the battery current;
means for monitoring the battery voltage;
means coupled to said battery temperature, current and voltage monitoring means for determining whether the battery is in a condition for fast charging; and
means coupled to said battery fast charging determining means and for coupling to the battery for providing a substantially constant predetermined power level sufficient to fast charge the battery when the battery is in a condition for fast charging and for providing a reduced amount of power when the battery is not in a condition for fast charging, wherein said power providing means includes:
DC source voltage means having a positive terminal and a negative terminal;
a transformer having a primary inductance including a first terminal and a second terminal and having a secondary inductance including a first terminal and a second terminal, where said first terminal of said primary inductance is coupled to said positive terminal of said DC source voltage means;
a transistor having an input terminal, an output terminal and a control terminal, said input terminal coupled to said second terminal of said primary inductance of said transformer, said control terminal providing an output power control input;
means coupled between said output terminal of said transistor and said negative terminal of said DC source voltage means for converting the level of current through said primary inductance of said transformer into a proportional voltage, said proportional voltage providing an output power sense output;
means for generating an oscillating signal having a constant predetermined frequency; and
activation means coupled to said oscillating signal means, said output power control input and said output power sense output, for providing a signal to said output power control input at the beginning of each cycle of said constant predetermined frequency, and for removing said signal to said output power control input if the level of said output power sense output reaches a predetermined maximum level.

22. The AC adapter of claim 21, wherein said activation means includes:
   means having a feedback input for removing said signal to said output power control input when the level of said output power sense output becomes substantially equal to the lesser of the level of said feedback input and said output power sense output predetermined maximum level; and
   said battery fast charging determining means having a voltage feedback output connected to said feedback input of said activation means, for providing a voltage feedback output level to limit the voltage output of said power regulated source means to a predetermined maximum voltage level when the battery is not in a condition for fast charging.

23. The AC adapter of claim 22, further comprising:
   current limit means coupled to said battery temperature monitoring means, said battery current monitoring means and said feedback input, for providing a current feedback output level to regulate the current through the battery to maintain a predetermined trickle current level when the battery temperature is not within allowable limits or after the battery has been discharged and then charged such that the battery temperature exceeds a predetermined high temperature level.

24. An AC adapter having an output for providing DC power to a substantially constant power load which can be selectively enabled or disabled having a maximum load value and being substantially constant above a lower voltage level and to charge a battery, where the load and the battery are each electrically coupled to the output, and the battery is removably connected to the circuit and has a fully charged voltage level, comprising:
   means for providing an unregulated DC source voltage;
   a transformer having a primary and a secondary, wherein said primary is coupled to said unregulated DC source voltage means;
   an output rectifier and filter means coupled to said transformer secondary for implementing flyback operation, wherein said transformer stores energy when current flows through said transformer primary and transfers said stored energy to said transformer secondary when the current flow through said transformer primary is terminated;
   a transistor having a control terminal and a current path, wherein said current path is coupled in series with said DC source voltage means, said transformer primary and ground, wherein said current path allows current flow through said transformer primary from said unregulated DC source voltage means to ground when turned on, and substantially terminates the current flow through said transformer primary when turned off;
   means coupled in series with said transformer primary for sensing the level of current through said transformer primary;
   means for generating an oscillating signal having a constant predetermined frequency;
   pulse width modulation means coupled to said oscillating signal means, said primary current sensing means, said transistor control terminal and said oscillating signal means for turning said transistor on at the beginning of each cycle of said constant predetermined frequency and for turning said transistor off when the current reaches a predetermined maximum level wherein said predetermined maximum current level corresponds to a predetermined maximum output power level; and
   wherein said predetermined maximum output power level exceeds the maximum load provided by the substantially constant load, so that the battery absorbs the remaining power transferred by said transformer and wherein said predetermined maximum power level is less than the battery fully charged voltage level times the current drawn by the substantially constant power load at the lower voltage level.

25. The AC adapter of claim 24, wherein said pulse width modulation means further comprises:
   means receiving a feedback signal for converting said feedback signal to an output power request signal having a voltage level indicative of the peak current through said transformer primary;
   means receiving said output power request signal for turning said transistor off when the current through said transformer primary becomes substantially equal to the lesser of the level of said output power request signal and said transformer primary predetermined maximum current level; and
   means coupled to the AC adapter output for providing said feedback signal for limiting the voltage output of the AC adapter to a predetermined maximum voltage level when the load presented to the AC adapter output would otherwise cause the AC adapter output voltage to exceed said predetermined maximum voltage level if said predetermined maximum output power were provided.

26. The AC adapter of claim 25, wherein said voltage output limit means includes:
   means for dividing the voltage output of the AC adapter for providing a proportional voltage signal;
   means for producing a reference voltage having a level corresponding to a desired voltage output level; and
   means coupled to said proportional voltage signal means, said reference voltage signal means and said feedback input, for amplifying any difference between said proportional voltage signal and said reference voltage, for providing a signal to said feedback input indicative of the level of error between the voltage of said voltage output of the AC adapter and said desired voltage level.

27. The AC adapter of claim 26, wherein said amplifying means comprises an error operational amplifier having two input terminals and one output terminal, said proportional voltage signal connected to one input terminal of said error amplifier, said reference voltage connected to the other input terminal of said error amplifier, and said output terminal of said error amplifier providing said signal indicative of the error between the voltage of the voltage output of the AC adapter and said desired voltage level.

28. The AC adapter of claim 25, further comprising:
   means for monitoring the battery temperature;
   means for monitoring the battery current; and
   current limit means coupled to said battery temperature monitoring means, said battery current monitoring means and said feedback input, for providing a current feedback output level to regulate the current provided to the substantially constant power load and the battery to maintain a predetermined trickle current level above the current required by the substantially constant power load when the battery temperature is not within allowable limits or after the battery has been discharged and then charged such that the battery temperature exceeds a predetermined high temperature level.

29. The AC adapter of claim 28, wherein said battery temperature monitoring means includes means for converting the battery temperature into a voltage signal having a level indicative of the battery temperature.

30. The AC adapter of claim 29, wherein said means for converting the battery temperature into said voltage signal includes a temperature sensor in good thermal contact with the battery, said temperature sensor having an output terminal which outputs said battery temperature voltage signal.

* * * * *